(12) United States Patent
Drysdale et al.

(10) Patent No.: US 8,772,420 B2
(45) Date of Patent: *Jul. 8, 2014

(54) FLUORINATED POLYESTER BLEND

(75) Inventors: Neville Everton Drysdale, Newark, DE (US); Fredrik Nederberg, Greenville, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 196 days.

This patent is subject to a terminal disclaimer.

(21) Appl. No.: 13/338,310

(22) Filed: Dec. 28, 2011

(65) Prior Publication Data

US 2013/0005921 A1 Jan. 3, 2013

Related U.S. Application Data

(60) Provisional application No. 61/427,659, filed on Dec. 28, 2010.

(51) Int. Cl.
*C08G 63/08* (2006.01)
*C08G 63/68* (2006.01)

(52) U.S. Cl.
USPC ........... 525/450; 528/299; 528/397; 528/401; 570/127; 570/129; 570/130; 570/131

(58) Field of Classification Search
None
See application file for complete search history.

(56) References Cited

U.S. PATENT DOCUMENTS

| | | | |
|---|---|---|---|
| 5,349,093 A | 9/1994 | Oka et al. | |
| 5,444,124 A | 8/1995 | Schlund et al. | |
| 5,948,480 A | 9/1999 | Murphy | |
| 6,136,437 A | 10/2000 | Reither | |
| 6,531,558 B1 * | 3/2003 | Shoichet et al. | 526/247 |
| 6,849,194 B2 * | 2/2005 | Robin et al. | 252/8 |
| 7,244,790 B2 | 7/2007 | Sunkara et al. | |
| 2007/0232170 A1 | 10/2007 | Atwood et al. | |
| 2010/0159186 A1 | 6/2010 | Samuelson et al. | |
| 2013/0005922 A1 * | 1/2013 | Drysdale et al. | 525/450 |
| 2013/0116387 A1 * | 5/2013 | Drysdale et al. | 525/444 |
| 2013/0116389 A1 * | 5/2013 | Drysdale et al. | 525/444 |

FOREIGN PATENT DOCUMENTS

| | | | |
|---|---|---|---|
| EP | 0893478 B1 | | 9/2004 |
| JP | 62197419 A | * | 9/1987 |
| JP | 03213398 A | * | 9/1991 |
| JP | 11092658 A | | 4/1999 |

OTHER PUBLICATIONS

EIC search #1 conducted Apr. 2, 2013.*
EIC search #2 conducted Apr. 17, 2013.*
EIC search #3 conducted Apr. 18, 2013.*
JP 03213398 (1991) translation by Schreiber Translations, Inc.*
International Patent Application, PCT Application No. PCT/US2011/067504, Mailed Sep. 12, 2012.
Related U.S. Appl. No. 13/338,369, filed Dec. 28, 2011.
Related U.S. Appl. No. 13/333,326, filed Dec. 28, 2011.
Related U.S. Appl. No. 13/338,360, filed Dec. 28, 2011.

\* cited by examiner

*Primary Examiner* — Hannah Pak

(57) ABSTRACT

A fluorinated polyester blend is prepared by melt blending a fluorovinyl ether functionalized polyester with a non-fluorinated polyester. The fluoroether functionalized polyester can be a homopolymer or a copolymer. The blend is useful for preparing fibers, yarns, fabrics, garments, carpets, and other shaped articles. The shaped articles exhibit durable soil, oil, and water repellency.

14 Claims, 6 Drawing Sheets

FLUORINATED POLYESTER BLEND

RELATED PATENT APPLICATIONS

The present invention is related to U.S. patent application Ser. Nos. 12/873,428 and 12/873,402, both filed on Sep. 1, 2010; and U.S. patent application Ser. Nos. 13/388,326, 13/338,360, and 13/338,369, all filed on Dec. 28, 2011.

FIELD OF THE INVENTION

The present invention is related to blends that are combinations of an aromatic polyester with another aromatic polyester having one or more fluoroether functionalized repeat units. The blend is suitable for use in preparing polyester shaped articles, in particular fibers and yarns, that exhibit improved soil resistance, oil resistance, and water resistance. In particular, the blends are useful in preparing films, fibers, fabrics, carpets, and rugs with enhanced soil resistance.

BACKGROUND

Soil resistance, stain resistance, and water repellency are long standing problems in carpets and textiles. It has long been known to apply fluorinated substances to the surfaces of carpet and textile fibers in order to reduce the surface wettability by oils, water borne dirt, and the like. Such topical treatments have been found to be fugitive, wearing off after periods short compared to the lifetime of the textile or carpet, and requiring reapplication, generally by the consumer or a private contractor, and can result in spotty treatment, and overall degradation in appearance.

SUMMARY OF THE INVENTION

The invention provides a blend composition comprising a first aromatic polyester selected from the group consisting of poly(trimethylene terephthalate) (PTT), poly(ethylene naphthalate) (PEN), poly(ethylene isophthalate), poly(trimethylene isophthalate), poly(butylene isophthalate), mixtures thereof, and copolymers thereof selected from the group consisting of poly(trimethylene terephthalate) (PTT), poly(ethylene naphthalate) (PEN), poly(ethylene isophthalate), poly(trimethylene isophthalate), poly(butylene isophthalate), mixtures thereof, and copolymers thereof and a second aromatic polyester in contact therewith, wherein the second aromatic polyester is present in the composition at a concentration; and, wherein the second aromatic polyester comprises a molar concentration of fluorovinylether functionalized repeat units represented by structure I

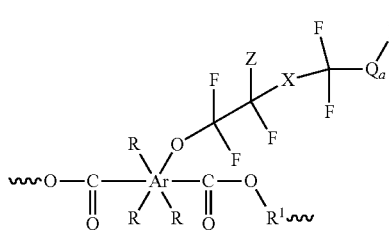

wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

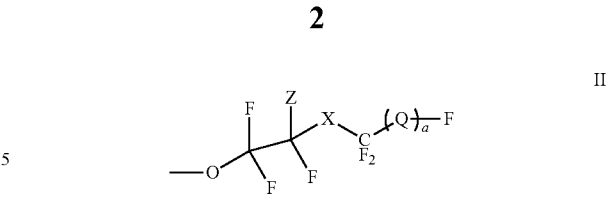

with the proviso that only one R can be OH or the radical represented by the structure II;
$R^1$ is a $C_2$-$C_4$ alkylene radical which can be branched or unbranched;
X is O or $CF_2$;
Z is H or Cl;
a=0 or 1;
and,
Q represents the structure (Ia)

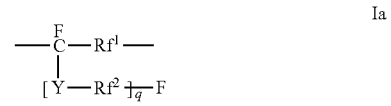

wherein q=0-10;
Y is O or $CF_2$;
$Rf^1$ is $(CF_2)_n$, wherein n is 0-10;
and,
$Rf^2$ is $(CF_2)_p$, wherein p is 0-10, with the proviso that when p is 0, Y is $CF_2$.

In another aspect, the invention provides a process comprising combining a first aromatic polyester selected from the group consisting of poly(trimethylene terephthalate) (PTT), poly(ethylene naphthalate) (PEN), poly(ethylene isophthalate), poly(trimethylene isophthalate), poly(butylene isophthalate), mixtures thereof, and copolymers thereof, with a second aromatic polyester to form a combination wherein the second aromatic polyester is present in the combination at a concentration; heating the combination to a temperature between the softening point of the first aromatic polyester and the degradation temperature of at least one component of the combination to form a viscous liquid mixture, and mixing the viscous liquid mixture until it has achieved the desired degree of homogeneity; the second aromatic polyester comprising a molar concentration of fluorovinylether functionalized repeat units represented by structure I

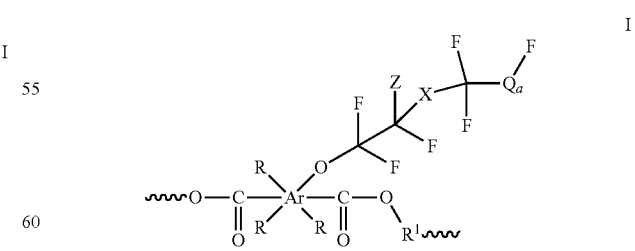

wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

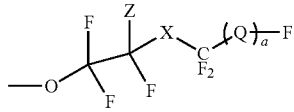

with the proviso that only one R can be OH or the radical represented by the structure (II);

$R^1$ is a $C_2$-$C_4$ alkylene radical which can be branched or unbranched;

X is O or $CF_2$;

Z is H or Cl;

a=0 or 1;

and,

Q represents the structure (Ia)

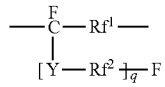

wherein q=0-10;

Y is O or $CF_2$;

$Rf^1$ is $(CF_2)_n$, wherein n is 0-10;

and, $Rf^2$ is $(CF_2)_p$, wherein p is 0-10, with the proviso that when p is 0, Y is $CF_2$.

In another aspect, the present invention provides a fiber or yarn comprising a blend composition comprising a first aromatic polyester selected from the group consisting of poly(trimethylene terephthalate) (PTT), poly(ethylene naphthalate) (PEN), poly(ethylene isophthalate), poly(trimethylene isophthalate), poly(butylene isophthalate), mixtures thereof, and copolymers thereof, and a second aromatic polyester in contact therewith, wherein the second aromatic polyester is present in the blend composition at a concentration; and, wherein the second aromatic polyester comprises a molar concentration of fluorovinylether functionalized repeat units represented by structure I

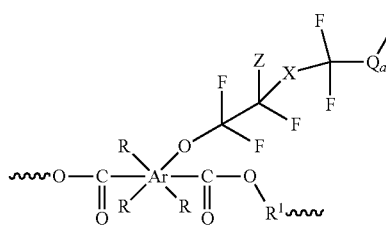

wherein,

Ar represents a benzene or naphthalene radical;

each R is independently H, $C_1$-$C_{10}$ alkyl, $C_5$-$C_{15}$ aryl, $C_6$-$C_{20}$ arylalkyl; OH, or a radical represented by the structure (II)

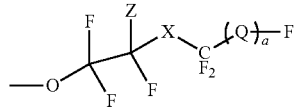

with the proviso that only one R can be OH or the radical represented by the structure II;

$R^1$ is a $C_2$-$C_4$ alkylene radical which can be branched or unbranched;

X is O or $CF_2$;

Z is H or Cl;

a=0 or 1;

and,

Q represents the structure (Ia)

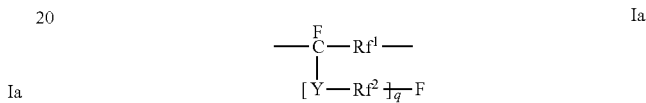

wherein q=0-10;

Y is O or $CF_2$;

$R_f^1$ is $(CF_2)_n$, wherein n is 0-10;

and, $R_f^2$ is $(CF_2)_p$, wherein p is 0-10, with the proviso that when p is 0, Y is $CF_2$.

In another aspect, the present invention provides a process comprising extruding a melt comprising a blend composition through an orifice having a cross-sectional shape, thereby forming a continuous filamentary extrudate, quenching the extrudate to solidify it into a continuous filament, wrapping the filament on a first driven roll heated to a temperature in the range of 60 to 100° C. and rotating at a first rotational speed, followed by wrapping the filament on a second driven roll heated to a temperature in the range of 100 to 130° C. and rotating at a second rotational speed; wherein the ratio of the first rotational speed to the second rotational speed lies in the range of 1.75 to 3, and accumulating the filament; wherein the blend composition comprises a first aromatic polyester selected from the group consisting of poly(trimethylene terephthalate) (PTT), poly(ethylene naphthalate) (PEN), poly(ethylene isophthalate), poly(trimethylene isophthalate), poly(butylene isophthalate), mixtures thereof, and copolymers thereof, and a second aromatic polyester in contact therewith, wherein the second aromatic polyester is present in the blend composition at a concentration; and, wherein the second aromatic polyester comprises a molar concentration of fluorovinylether functionalized repeat units represented by structure I

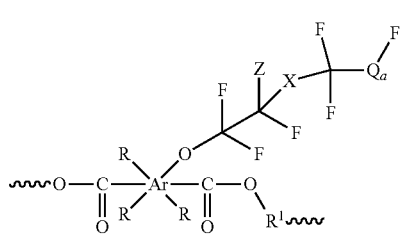

wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

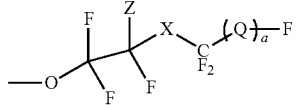

II with the proviso that only one R can be OH or the radical represented by the structure II;
$R^1$ is a $C_2$-$C_4$ alkylene radical which can be branched or unbranched;
X is O or $CF_2$;
Z is H or Cl;
a=0 or 1;
and,
Q represents the structure (Ia)

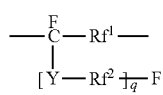

Ia wherein q=0-10;
  Y is O or $CF_2$;
  $R_f^1$ is $(CF_2)_n$, wherein n is 0-10;
  and,
  $R_f^2$ is $(CF_2)_p$, wherein p is 0-10, with the proviso that when p is 0, Y is $CF_2$.

In another aspect, the present invention provides a fabric comprising a plurality of filaments at least a portion of the filaments comprising a blend composition comprising a first aromatic polyester selected from the group consisting of poly(trimethylene terephthalate) (PTT), poly(ethylene naphthalate) (PEN), poly(ethylene isophthalate), poly(trimethylene isophthalate), poly(butylene isophthalate), mixtures thereof, and copolymers thereof, and a second aromatic polyester in contact therewith, wherein the second aromatic polyester is present in the blend composition at a concentration; and, wherein the second aromatic polyester comprises a molar concentration of fluorovinylether functionalized repeat units represented by structure I

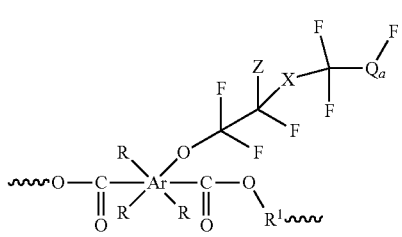

I wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

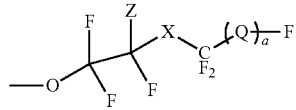

II with the proviso that only one R can be OH or the radical represented by the structure II;
$R^1$ is a $C_2$-$C_4$ alkylene radical which can be branched or unbranched;
X is O or $CF_2$;
Z is H or Cl;
a=0 or 1;
and,
Q represents the structure (Ia)

Ia

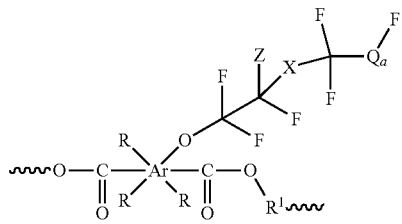

wherein q=0-10;
  Y is O or $CF_2$;
  $R_f^1$ is $(CF_2)_n$, wherein n is 0-10;
  and,
  $R_f^2$ is $(CF_2)_p$, wherein p is 0-10, with the proviso that when p is 0, Y is $CF_2$.

In another aspect, the present invention provides a carpet comprising a backing, a yarn tufted into the backing, and an adhesive binding the yarn and the backing at the point of contact therebetween, the yarn comprising filaments at least a portion of which the filaments comprise a blend composition comprising a first aromatic polyester selected from the group consisting of poly(trimethylene terephthalate) (PTT), poly(ethylene naphthalate) (PEN), poly(ethylene isophthalate), poly(trimethylene isophthalate), poly(butylene isophthalate), mixtures thereof, and copolymers thereof, and a second aromatic polyester in contact therewith, wherein the second aromatic polyester is present in the blend composition at a concentration; and, wherein the second aromatic polyester comprises a molar concentration of fluorovinylether functionalized repeat units represented by structure I

I wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

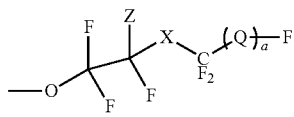

with the proviso that only one R can be OH or the radical represented by the structure II;
$R^1$ is a $C_2$-$C_4$ alkylene radical which can be branched or unbranched;
X is O or $CF_2$;
Z is H or Cl;
a=0 or 1;
and,
Q represents the structure (Ia)

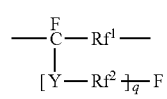

wherein q=0-10;
Y is O or $CF_2$;
$R_f^1$ is $(CF_2)_n$, wherein n is 0-10;
and,
$R_f^2$ is $(CF_2)_p$, wherein p is 0-10, with the proviso that when p is 0, Y is $CF_2$.

DETAILED DESCRIPTION

Figure 1:
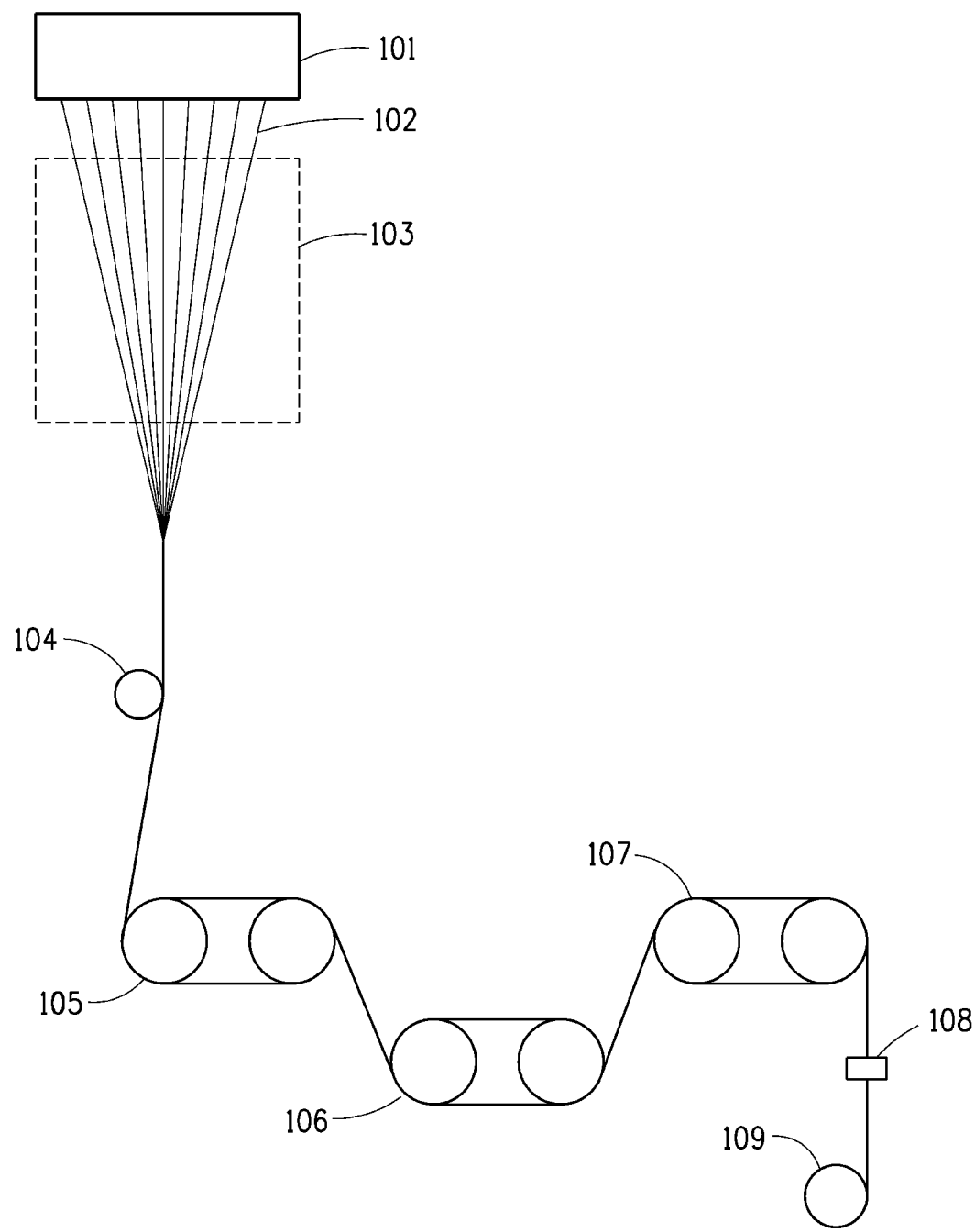
FIG. 1 is a schematic drawing of a melt spinning apparatus suitable for use in making fibers and yarns according to embodiments of the invention.

The blend compositions disclosed herein comprise a first aromatic polyester selected from the group consisting of poly(trimethylene terephthalate) (PTT), poly(ethylene naphthalate) (PEN), poly(ethylene isophthalate), poly(trimethylene isophthalate), poly(butylene isophthalate), mixtures thereof, and copolymers thereof, and a second aromatic polyester in contact therewith, wherein the second aromatic polyester is present in the composition at a concentration; and, wherein the second aromatic polyester comprises a molar concentration of fluorovinylether functionalized repeat units represented by structure I, as shown supra. The blend composition has utility for producing polyester shaped articles, in particular fibers and yarns that exhibit significantly improved soil resistance and water resistance compared to shaped articles prepared from the first aromatic polyester alone. The blend composition can also be used for forming molded articles of any shape.

The desired effects of soil repellency, oil repellency, and water repellency in shaped articles, in particular fibers and yarns, formed from the blends depend upon the surface concentration of fluorine. It has been found that surface concentrations of 1-5 atom-% of fluorine result in desirable levels of repellency. A fiber or film prepared from the blend composition exhibits orders of magnitude higher so-called "fluorine efficiency" versus that of a fiber or film prepared from an unblended fluoropolymer having the same surface fluorine concentration. Fluorine efficiency, as used herein for a shaped article, is defined as the ratio of the surface concentration of fluorine to the total concentration of fluorine in the shaped article.

It has further been found that certain processes reduce fluorine efficiency while others enhance it. For example, pressure dyeing of a fabric prepared from a yarn of a blend fiber tends to decrease the fluorine efficiency of the fabric. Heat treatment above $T_g$ following pressure dyeing has been observed to restore the fluorine efficiency. It is also found that topical deposits such as processing oils and finishes, such as those commonly employed in fiber spinning and fabrication of textile goods, tend to mask the fluorinated surface, degrading the soil repellency. Normal scouring, such as routinely performed in textile dyeing and finishing, is effective at restoring the high degree of soil repellency of yarns and fabrics prepared from the blend composition.

When a range of values is provided herein, it is intended to encompass the end-points of the range unless specifically stated otherwise. Numerical values used herein have the precision of the number of significant figures provided, following the standard protocol in chemistry for significant figures as outlined in ASTM E29-08 Section 6. For example, the number 40 encompasses a range from 35.0 to 44.9, whereas the number 40.0 encompasses a range from 39.50 to 40.49.

The parameters n, p, and q as employed herein are each independently integers in the range of 1-10.

As used herein, the term "fluorovinyl ether functionalized aromatic diester" refers to that subclass of compounds of structure (III), infra, wherein $R^2$ is $C_1$-$C_{10}$ alkyl. The term "fluorovinyl ether functionalized aromatic diacid" refers to that subclass of compounds of structure (III), infra, wherein $R^2$ is H. The term "perfluorovinyl compound" refers to the olefinically unsaturated compound represented by structure (VII), infra. The term "fluorovinylether functionalized aromatic polyester" refers to a polyester comprising a repeat unit as depicted in structure I.

As used herein, the term "copolymer" refers to a polymer comprising two or more chemically distinct repeat units, including dipolymers, terpolymers, tetrapolymers and the like. The term "homopolymer" refers to a polymer consisting of a plurality of repeat units that are chemically indistinguishable from one another.

In any chemical structure herein, when a terminal bond is shown as "—", where no terminal chemical group is indicated, the terminal bond "—" indicates a radical. For example, —$CH_3$ represents a methyl radical.

In one embodiment, the first aromatic polyester is a semi-crystalline polymer selected from the group consisting of poly(trimethylene terephthalate) (PTT), poly(ethylene naphthalate) (PEN), poly(ethylene isophthalate), poly(trimethylene isophthalate), poly(butylene isophthalate), mixtures thereof, and copolymers thereof. Semi-crystalline polymers have melting points. In the present disclosure, the softening point in a process refers to the melting point of a semi-crystalline first aromatic polyester.

In an alternative embodiment, the first aromatic polyester is an amorphous polymer, such as copolymers comprising repeat units of poly(trimethylene terephthalate) (PTT), poly(ethylene naphthalate) (PEN), poly(ethylene isophthalate), poly(trimethylene isophthalate) or poly(butylene isophthalate). In such embodiment, there is no melting point, and the softening point in the process can be determined according to ASTM D1525-09, also known as the Vicat softening point. Suitable amorphous polyesters include copolymers with such species as cyclohexane dimethanol, or copolymers of terephthalic and isophthalic acid moieties.

In one aspect, the present invention provides a composition comprising a first aromatic polyester selected from the group consisting of poly(trimethylene terephthalate) (PTT), poly(ethylene naphthalate) (PEN), poly(ethylene isophthalate), poly(trimethylene isophthalate), poly(butylene isophthalate), mixtures thereof, and copolymers thereof, and a second aromatic polyester in contact therewith, wherein the second aromatic polyester is present in the composition at a concentration; and, wherein the second aromatic polyester comprises a molar concentration of fluorovinylether functionalized repeat units represented by structure I

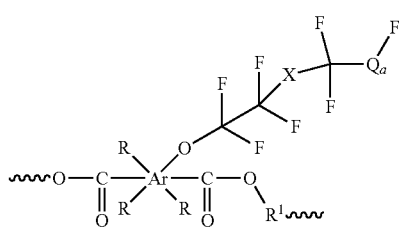

wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

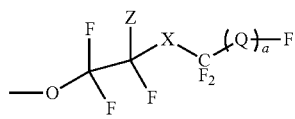

with the proviso that only one R can be OH or the radical represented by the structure II;
$R^1$ is a $C_2$-$C_4$ alkylene radical which can be branched or unbranched;
X is O or $CF_2$;
Z is H or Cl;
a=0 or 1;
and,
Q represents the structure (Ia)

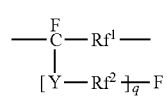

wherein q=0-10;
Y is O or $CF_2$;
$Rf^1$ is $(CF_2)_n$, wherein n is 0-10;
and,
$Rf^2$ is $(CF_2)_p$, wherein p is 0-10, with the proviso that when p is 0, Y is $CF_2$.

In one embodiment, the first aromatic polyester is poly(trimethylene terephthalate).

In one embodiment, the molar concentration of fluorovinylether functionalized repeat units represented by structure I is in the range of 40-100 mol-%.

In one embodiment, the molar concentration of fluorovinylether functionalized repeat units represented by structure I is in the range of 40-60 mol-%.

In one embodiment, the second aromatic polyester is present in the composition at a concentration in the range of 0.1 to 10% by weight.

In a further embodiment, the second aromatic polyester is present in the composition at a concentration in the range of 0.5 to 5% by weight.

In a further embodiment, the second aromatic polyester is present in the composition at a concentration in the range of 1 to 3% by weight.

In one embodiment the molar concentration of fluorovinylether functionalized repeat units represented by structure I is in the range of 40-60 mol-%, and the second aromatic polyester is present in the composition at a concentration in the range of 1 to 2% by weight.

In one embodiment in the fluoroether functionalized repeat unit represented by structure I, each R is H.

In one embodiment in the fluoroether functionalized repeat unit represented by structure I, one R is a radical represented by the structure (II) and the remaining two Rs are each H.

In one embodiment in the fluoroether functionalized repeat unit represented by structure I, $R^1$ is an a trimethylene radical, which can be branched or unbranched.

In one embodiment in the fluoroether functionalized repeat unit represented by structure I, $R^1$ is an unbranched trimethylene radical.

In one embodiment in the fluoroether functionalized repeat unit represented by structure I, X is O.

In one embodiment in the fluoroether functionalized repeat unit represented by structure I, X is $CF_2$.

In one embodiment in the fluoroether functionalized repeat unit represented by structure I, Y is O.

In one embodiment in the fluoroether functionalized repeat unit represented by structure I, Y is $CF_2$.

In one embodiment in the fluoroether functionalized repeat unit represented by structure I, Z is H.

In one embodiment in the fluoroether functionalized repeat unit represented by structure I, $Rf^1$ is $CF_2$.

In one embodiment in the fluoroether functionalized repeat unit represented by structure I, $Rf^2$ is $CF_2$.

In one embodiment in the fluoroether functionalized repeat unit represented by structure I, p=0, and Y is $CF_2$.

In one embodiment in the fluoroether functionalized repeat unit represented by structure I, a=0.

In one embodiment in the fluoroether functionalized repeat unit represented by structure I a=1, q=0, and n=0.

In one embodiment in the fluoroether functionalized repeat unit represented by structure I, a=1, each R is H, Z is H, $R^1$ is methoxy, X is O, Y is O, $Rf^1$ is $CF_2$, and $Rf^2$ is perfluoropropenyl, and q=1.

In one embodiment in the fluoroether functionalized repeat unit represented by structure I the repeat unit is represented by the structure (IVa)

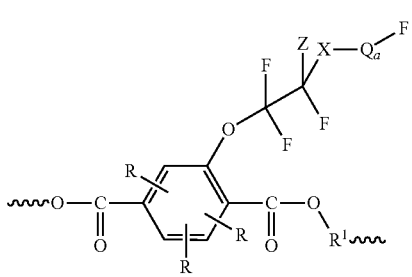

IVa wherein R, R¹, Z, X, Q, and a are as stated supra.

In one embodiment in the fluoroether functionalized repeat unit represented by structure I the repeat unit is represented by the structure (IVb)

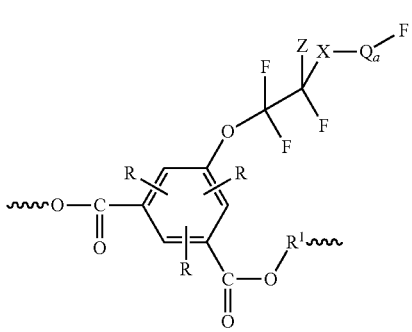

IVb

In one embodiment the second aromatic polyester further comprises arylate repeat units represented by the structure (V),

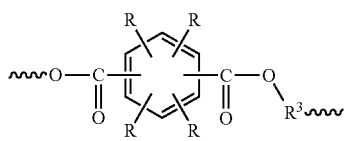

V wherein each R is independently H or alkyl, and $R^3$ is $C_2$-$C_4$ alkylene which can be branched or unbranched, with the proviso that when structure V is the condensation product of terephthalic acid and an olefin, the alkylene radical is $C_3$.

While there is no theoretical limitation on the molecular weight of the second aromatic polyester, there is a practical benefit to employing a second aromatic polyester with sufficient molecular mobility in the melt to migrate to the surface of, e.g., a melt spun yarn. Number average molecular weight in the range of 7,000-13,000 Da has been found to be advantageous.

In another aspect, there is provided a process comprising combining a first aromatic polyester selected from the group consisting of poly(trimethylene terephthalate) (PTT), poly (ethylene naphthalate) (PEN), poly(ethylene isophthalate), poly(trimethylene isophthalate), poly(butylene isophthalate), mixtures thereof, and copolymers thereof, with a second aromatic polyester to form a combination wherein the second aromatic polyester is present in the combination at a concentration; heating the combination to a temperature between the softening point of the first aromatic polyester and the degradation temperature of at least one component of the combination to form a viscous liquid mixture, and mixing the viscous liquid mixture until it has achieved the desired degree of homogeneity; the second aromatic polyester comprising a molar concentration of fluorovinylether functionalized repeat units represented by structure I

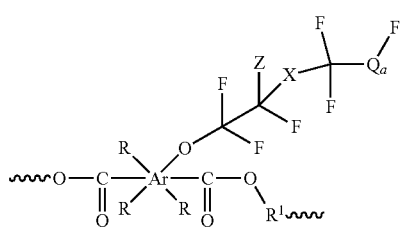

I wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

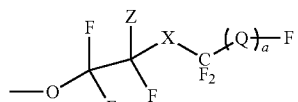

II with the proviso that only one R can be OH or the radical represented by the structure (II);
$R^1$ is a $C_2$-$C_4$ alkylene radical which can be branched or unbranched;
X is O or $CF_2$;
Z is H or Cl;
a=0 or 1;
and,
Q represents the structure (Ia)

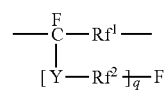

Ia wherein q=0-10;
Y is O or $CF_2$;
$Rf^1$ is $(CF_2)_n$, wherein n is 0-10;
and,
$Rf^2$ is $(CF_2)_p$, wherein p is 0-10, with the proviso that when p is 0, Y is $CF_2$.

In one embodiment of the process, the first aromatic polyester is poly(trimethylene terephthalate).

In one embodiment of the process the second aromatic polyester is a copolymer comprising a molar concentration of 40-100% of fluorovinylether functionalized repeat units represented by structure I.

In one embodiment of the process, the second aromatic polyester is combined with the first aromatic polyester at 0.1 to 10% by weight of the total composition.

In a further embodiment, the second aromatic polyester is combined with the first aromatic polyester at 0.5 to 5% by weight of the total composition.

In one embodiment of the process, the second aromatic polyester comprises a molar concentration of 40-50% of fluorovinylether functionalized repeat units represented by structure I, and is combined with the first aromatic polyester selected from the group consisting of poly(trimethylene terephthalate) (PTT), poly(ethylene naphthalate) (PEN), poly(ethylene isophthalate), poly(trimethylene isophthalate), poly(butylene isophthalate), mixtures thereof, and copolymers thereof at 1 to 2% by weight of the total composition.

In one embodiment of the process, in the fluoroether functionalized repeat unit represented by structure I, each R is H.

In one embodiment of the process, in the fluoroether functionalized repeat unit represented by structure I, one R is a radical represented by the structure (II) and the remaining two Rs are each H.

In one embodiment of the process, in the fluoroether functionalized repeat unit represented by structure I, $R^1$ is an ethylene radical a trimethylene radical, which can be branched or unbranched; or a tetramethylene radical, which can be branched or unbranched.

In one embodiment of the process, in the fluoroether functionalized repeat unit represented by structure I, $R^1$ is an unbranched trimethylene radical.

In one embodiment of the process, in the fluoroether functionalized repeat unit represented by structure I, X is O.

In one embodiment of the process, in the fluoroether functionalized repeat unit represented by structure I, X is $CF_2$.

In one embodiment of the process, in the fluoroether functionalized repeat unit represented by structure I, Y is O.

In one embodiment of the process, in the fluoroether functionalized repeat unit represented by structure I, Y is $CF_2$.

In one embodiment of the process, in the fluoroether functionalized repeat unit represented by structure I, Z is H.

In one embodiment of the process, in the fluoroether functionalized repeat unit represented by structure I, $Rf^1$ is $CF_2$.

In one embodiment of the process, in the fluoroether functionalized repeat unit represented by structure I, $Rf^2$ is $CF_2$.

In one embodiment of the process, in the fluoroether functionalized repeat unit represented by structure I, p=0, and Y is $CF_2$.

In one embodiment of the process, in the fluoroether functionalized repeat unit represented by structure I, a=0.

In one embodiment of the process, in the fluoroether functionalized repeat unit represented by structure I a=1, q=0, and n=0.

In one embodiment of the process, in the fluoroether functionalized repeat unit represented by structure I, a=1, each R is H, Z is H, $R^1$ is methoxy, X is O, Y is O, $Rf^1$ is $CF_2$, and $Rf^2$ is perfluoropropenyl, and q=1.

In one embodiment of the process, in the fluoroether functionalized repeat unit represented by structure I the repeat unit is represented by the structure (IVa)

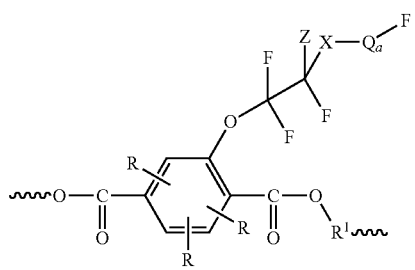

wherein R, $R^1$, Z, X, Q, and a are as stated supra.

In one embodiment of the process, in the fluoroether functionalized repeat unit represented by structure I the repeat unit is represented by the structure (IVb)

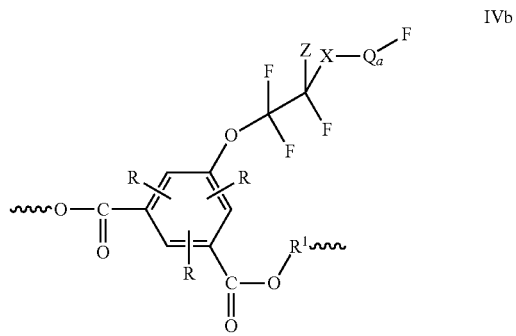

In one embodiment of the process, the second aromatic polyester further comprises repeat units represented by the structure (V),

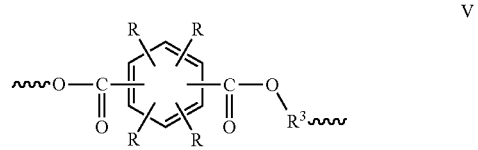

wherein each R is independently H or alkyl, and $R^3$ is $C_2$-$C_4$ alkylene which can be branched or unbranched with the proviso that when structure V is the condensation product of terephthalic acid and an olefin, the alkylene radical is $C_3$.

According to the process, mixing is continued until the desired degree of homogeneity is achieved. The mixing endpoint will depend upon the requisites of any particular application. Mixing can be performed both batch-wise and continuously. In batch mixing, one indicator of homogeneity is the point at which the torque applied to the mixing tool becomes constant. Suitable batch mixers include but are not limited to Banbury internal mixers. In a continuous mixing process, homogeneity can be evaluated by any suitable method including but not limited to measuring variations in bulk density of the product stream, short or long term variability of die pressure during strand extrusion, visual observation of the extruded strand, or evaluation of production samples under a microscope. Suitable continuous mixers include, but are not limited to twin screw extruders, Farrel continuous mixers, and the like, all well known in the art.

The second aromatic polyester comprising fluorovinylether functionalized repeat units represented by structure I can be prepared by a process comprising combining a fluorovinyl ether functionalized aromatic diester or diacid with an excess of $C_2$-$C_4$ alkylene glycol or a mixture thereof, branched or unbranched; and a catalyst to form a reaction mixture. The reaction can be conducted in the melt, preferably within the temperature range of 180 to −240° C., to initially condense either methanol or water, after which the mixture can be further heated, preferably to a temperature within the range of 210 to −300° C., and evacuated, to remove excess $C_2$-$C_4$ glycol and thereby form a polymer comprising repeat units having the structure (I), wherein the fluorovinyl ether functionalized aromatic diester or diacid is represented by the structure (III),

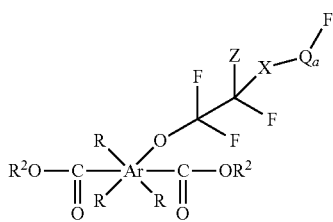

wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

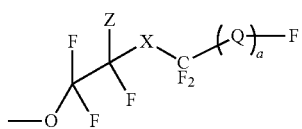

with the proviso that only one R can be OH or the radical represented by the structure (II);
$R^2$ is H or $C_1$-$C_{10}$ alkyl;
X is O or $CF_2$;
Z is H, Cl, or Br;
a=0 or 1;
and,
Q represents the structure (Ia)

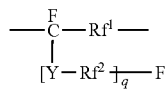

wherein q=0-10;
Y is O or $CF_2$;
$R_f^1$ is $(CF_2)_n$, wherein n is 0-10;
and,
$R_f^2$ is $(CF_2)_p$, wherein p is 0-10, with the proviso that when p is 0, Y is $CF_2$. In some embodiments, the reaction is carried out at about the reflux temperature of the reaction mixture.
In one embodiment of the process, one R is OH.
In one embodiment of the process, each R is H.
In one embodiment of the process, one R is OH and the remaining two Rs are each H.
In one embodiment of the process, one R is represented by the structure (II) and the remaining two Rs are each H.
In one embodiment of the process, $R^2$ is H.
In one embodiment of the process, $R^2$ is methyl.
In one embodiment of the process, X is O. In an alternative embodiment, X is $CF_2$.
In one embodiment of the process, Y is O. In an alternative embodiment, Y is $CF_2$.
In one embodiment of the process Z is Cl or Br. In a further embodiment, Z is Cl. In an alternative embodiment, one R is represented by the structure (II), and one Z is H. In a further embodiment, one R is represented by the structure (II), one Z is H, and one Z is Cl.
In one embodiment of the process, $R_f^1$ is $CF_2$.
In one embodiment of the process, $R_f^2$ is $CF_2$.

In one embodiment of the process, $R_f^2$ is a bond (that is, p=0), and Y is $CF_2$.
In one embodiment, a=0.
In one embodiment, a=1, q=0, and n=0.
In one embodiment of the process, each R is H, Z is Cl, $R^2$ is methyl, X is O, Y is O, $R_f^1$ is $CF_2$, and $R_f^2$ is perfluoropropenyl, and q=1.
Suitable alkylene glycols include but are not limited to 1,2-ethanediol, 1,3-propanediol, 1,4-butanediol, and mixtures thereof. In one embodiment, the alkylene glycol is 1,3-propanediol.
Suitable catalysts include but are not limited to titanium (IV) butoxide, titanium (IV) isopropoxide, antimony trioxide, antimony triglycolate, sodium acetate, manganese acetate, and dibutyl tin oxide. The selection of catalysts is based on the degree of reactivity associated with the selected glycol. For example, it is known that 1,3-propanediol is considerably less reactive than is 1,2-ethanediol. Titanium butoxide and dibutyl tin oxide—both considered "hot" catalysts—have been found to be suitable for process when 1,3-propanediol is employed, but are considered over-active for the process when 1,2-ethanediol.
The reaction can be carried out in the melt. The thus resulting polymer can be separated by vacuum distillation to remove the excess of $C_2$-$C_4$ glycol.
In one embodiment the reaction mixture comprises more than one embodiment of the repeat units encompassed in structure (I).
In another embodiment, the reaction mixture further comprises an aromatic diester or aromatic diacid represented by the structure (VI)

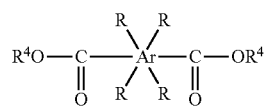

wherein Ar is an aromatic radical, $R^4$ is H or $C_1$-$C_{10}$ alkyl, and each R is independently H or $C_1$-$C_{10}$ alkyl. In a further embodiment, $R^4$ is H and each R is H. In an alternative embodiment, $R^4$ is methyl and each R is H. In one embodiment Ar is benzyl. In an alternative embodiment, Ar is naphthyl.
Suitable aromatic diesters of structure (VI) include but are not limited to dimethyl terephthalate, dimethyl isophthalate, 2,6-naphthalene dimethyldicarboxylate, methyl 4,4'-sulfonyl bisbenzoate, methyl 4-sulfophthalic ester, and methyl biphenyl-4,4'-dicarboxylate. In one embodiment, the aromatic diester is dimethyl terephthalate. In an alternative embodiment, the aromatic diester is dimethyl isophthalate. Suitable aromatic diacids of structure (VI) include but are not limited to isophthalic acid, terephthalic acid, 2,6-naphthalene dicarboxylic acid, 4,4'-sulfonyl bisbenzoic acid, 4-sulfophthalic acid and biphenyl-4,4'-dicarboxylic acid. In one embodiment, the aromatic diacid is terephthalic acid. In an alternative embodiment, the aromatic diacid is isophthalic acid.
Suitable fluorovinyl ether functionalized aromatic diesters can be prepared by forming a reaction mixture comprising a hydroxy aromatic diester in the presence of a solvent and a catalyst with a perfluoro vinyl compound represented by the structure (VII)

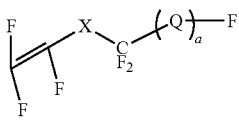

wherein X is O or $CF_2$, a=0 or 1; and, Q represents the structure (Ia)

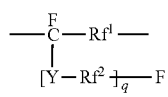

wherein q=0-10;
Y is O or $CF_2$;
$R_f^1$ is $(CF_2)_n$, wherein n is 0-10;
$R_f^2$ is $(CF_2)_p$, wherein p is 0-10, with the proviso that when p is 0, Y is $CF_2$;
at a temperature between about −70° C. and the reflux temperature of the reaction mixture.

Suitable perfluorovinyl ethers can range from perfluoromethyl vinyl ether to PPPVE and larger perfluorovinyl ethers. It has been found that PPVE and PPPVE are particularly suitable.

Preferably the reaction is conducted using agitation at a temperature above room temperature but below the reflux temperature of the reaction mixture. The reaction mixture is cooled following reaction.

When a halogenated solvent is employed, the group indicated as "Z" in the resulting fluorovinyl ether aromatic diester represented by structure (III) is the corresponding halogen. Suitable halogenated solvents include but are not limited to tetrachloromethane, tetrabromomethane, hexachloroethane and hexabromoethane. If the solvent is non-halogenated Z is H. Suitable non-halogenated solvents include but are not limited to tetrahydrofuran (THF), dioxane, and dimethylformamide (DMF).

The reaction is catalyzed by a base. A variety of basic catalysts can be used, i.e., any catalyst that is capable of deprotonating phenol. That is, a suitable catalyst is any catalyst having a pKa greater than that of phenol (9.95, using water at 25° C. as reference). Suitable catalysts include, but are not limited to, sodium methoxide, calcium hydride, sodium metal, potassium methoxide, potassium t-butoxide, potassium carbonate or sodium carbonate. Preferred are potassium t-butoxide, potassium carbonate, or sodium carbonate.

Reaction can be terminated at any desirable point by the addition of acid (such as, but not limited to, 10% HCl). Alternatively, when using solid catalysts, such as the carbonate catalysts, the reaction mixture can be filtered to remove the catalyst, thereby terminating the reaction.

Suitable hydroxy aromatic diesters include, but are not limited to, 1,4-dimethyl-2-hydroxy terephthalate, 1,4-diethyl-2-5-dihydroxy terephthalate, 1,3-dimethyl 4-hydroxyisophthalate, 1,3-dimethyl-5-hydroxy isophthalate, 1,3-dimethyl 2-hydroxyisophthalate, 1,3-dimethyl 2,5-dihydroxyisophthalate, 1,3-dimethyl 2,4-dihydroxyisophthalate, dimethyl 3-hydroxyphthalate, dimethyl 4-hydroxyphthalate, dimethyl 3,4-dihydroxyphthalate, dimethyl 4,5-dihydroxyphthalate, dimethyl 3,6-dihydroxyphthalate, dimethyl 4,8-dihydroxynaphthalene-1,5-dicarboxylate, dimethyl 3,7-dihydroxynaphthalene-1,5-dicarboxylate, dimethyl 2,6-dihydroxynaphthalene-1,5-dicarboxylate, or mixtures thereof.

Suitable perfluorovinyl compounds include, but are not limited to, 1,1,1,2,2,3,3-heptafluoro-3-(1,1,1,2,3,3-hexafluoro-3-(1,2,2-trifluorovinyloxy)propan-2-yloxy)propane, heptafluoropropyltrifluorovinylether, perfluoropent-1-ene, perfluorohex-1-ene, perfluorohept-1-ene, perfluorooct-1-ene, perfluoronon-1-ene, perfluorodec-1-ene, and mixtures thereof.

To prepare a suitable fluorovinyl ether functionalized aromatic diester, a suitable hydroxy aromatic diester and a suitable perfluovinyl compound are combined in the presence of a suitable solvent and a suitable catalyst until the reaction has achieved the desired degree of conversion. The reaction can be continued until no further product is produced over some preselected time scale. The reaction time to achieve the desired degree of conversion depends upon the reaction temperature, the chemical reactivity of the specific reaction mixture components, and the degree of mixing applied to the reaction mixture. Progress of the reaction can be monitored using any one of a variety of established analytical methods, such as, for example, nuclear magnetic resonance spectroscopy, thin layer chromatography, and gas chromatography.

When the desired level of conversion has been achieved, the reaction mixture is quenched, as described supra. The quenched reaction mixture can be concentrated under vacuum, and rinsed with a solvent. Under some circumstances, a plurality of compounds encompassed by the structure (III) can be made in a single reaction mixture. In such cases, separation of the products thus produced can be effected by any method known to the skilled artisan such as, for example, distillation or column chromatography.

If it is desired to employ the corresponding diacid as the monomer instead of the diester, the thus produced fluorovinyl ether functionalized aromatic diester can be contacted with an aqueous base, preferably a strong base such as KOH or NaOH at a gentle reflux, followed by cooling to room temperature, followed by acidifying the mixture, preferably with a strong acid, such as HCl or $H_2SO_4$, until the pH is between 0 and 2. Preferably pH is 1. The acidification causes the precipitation of the fluorovinyl ether functionalized aromatic diacid. The precipitated diacid can then be isolated via filtration and recrystallization from suitable solvents (e.g., redissolved in a solvent such as ethyl acetate, and then recrystallized). The progress of the reaction can be followed by any convenient method, such as thin layer chromatography, gas chromatography and NMR.

The blend composition is advantageously employed for the melt spinning of fibers suitable for combination into textile and carpet yarns. A variety of fibers can be spun from the composition. In one embodiment, fibers and yarns of low denier per filament (dpf), especially below 5 dpf, more especially in the range of 1 to 3 dpf, including both spun-drawn and partially oriented fibers and yarns, are readily melt spun from the blend compositions. The low dpf yarns are well-suited for use in producing knitted and woven goods. In another embodiment, fibers and yarns of high dpf, especially above higher than 10 dpf, more especially in the range of 15 to 25 dpf, can be melt spun from the blend compositions. The high dpf yarns are well-suited for production of carpets and related goods. The high dpf fibers and yarns can be produced as bulked continuous filament yarns (BCF) useful for the preparation of carpet.

In a typical melt spinning process, several embodiments of which are described infra, the dried polymer blend pellets are fed to an extruder which melts the pellets and supplies the resulting melt to a metering pump, which delivers a volumetrically controlled flow of polymer into a heated spinning pack via a transfer line. The pump provides a pressure of about 2-20 MPa to force the flow through the spinning pack, which contains filtration media (e.g., a sand bed and a filter screen) to remove any particles larger than a few micrometers. The mass flow rate through the spinneret is controlled by the metering pump. At the bottom of the pack, the polymer exits into an air quench zone through a plurality of small holes in a thick plate of metal (the spinneret). While the number of holes and the dimensions thereof can vary greatly, typically a single spinneret hole has a diameter in the range of 0.2-0.4 mm. Spinning is advantageously accomplished at a spinneret temperature of 235 to 295° C., preferably 250 to 290° C. A typical flow rate through a hole of that size tends to be in the range of 0.5-5 g/min. Numerous cross-sectional shapes are employed for spinneret holes, although circular cross-section is most common. Typically a highly controlled rotating roll system through which the spun filaments are wound controls the line speed. The diameter of the filaments is determined by the flow rate and the take-up speed; and not by the spinneret hole size.

The properties of filaments are determined by the threadline dynamics, particularly in the quench zone that lies between the exit from the spinneret and the solidification point of the filaments. The specific design of the quench zone on the emerging still motile filaments affects the quenched filament properties. Both cross-flow quench and radial quench are in common use. After quenching or solidification, the filaments travel at the take-up speed, that is typically 100-200 times faster than the exit speed from the spinneret hole. Thus, considerable acceleration (and stretching) of the threadline occurs after emergence from the spinneret hole. The amount of orientation that is frozen into the spun filament is directly related to the stress level in the filament at the solidification point.

The melt spun filament thereby produced is collected in a manner consistent with the desired end-use. For example, for filament intended to be converted into staple fiber, a plurality of continuous filaments can be combined into a tow that is accumulated in a so-called piddling can. Filament intended for use in continuous form, such as in texturing, is typically wound on a yarn package mounted on a tension-controlled wind-up.

Staple fibers can be prepared by melt spinning the blend composition into filaments, quenching the filaments, drawing the quenched filaments, crimping the drawn filaments, and cutting the filaments into staple fibers, preferably having a length of 0.2 to 6 inches (0.5 to 15 cm). One preferred process comprises: (a) melt spinning continuous filaments of the blend composition at a spinneret temperature in the range of 245 to 285° C., (b) drawing the quenched filaments, (c) crimping the drawn filaments using a mechanical crimper at a crimp level of 8 to 30 crimps per inch (3 to 12 crimps/cm), (d) relaxing the crimped filaments at a temperature of 50 to 120° c., and e.g.) cutting the relaxed filaments into staple fibers, preferably having a length of 0.2 to 6 inches (0.5 to 15 cm). In one preferred embodiment of this process, the drawn filaments are annealed at 85 to 115° C. before crimping. Preferably, annealing is carried out under tension using heated rollers. In another preferred embodiment, the drawn filaments are not annealed before crimping. Staple fibers are useful in preparing textile yarns and textile or nonwoven fabrics, and can also be used for fiberfill applications and making carpets.

FIG. 1 depicts one suitable arrangement for melt spinning according to the invention. 34 filaments 102, (all 34 filaments are not shown) are extruded through a 34-hole spinneret, 101. The filaments pass through a quench zone 103, are formed into a yarn bundle, and passed over a finish applicator 104. In the quench zone air is impinged upon the yarn bundle, normally at room temperature and 60% relative humidity, at a typical velocity of 40 feet/min. The quench zone can be designed for so-called cross-air-quench wherein the air flows across the yarn bundle, or for so-called radial quench wherein the air source is in the middle of the converging filaments and flows radially outward over 360°. Radial quench is a more uniform and effective quench method. Following the finish applicator 104, the yarn is passed to a first driven godet roll 105, also known as a feed roll, set at 40 to 100° C., in one embodiment, 70 to 100° C., coupled with a separator roll. The yarn is wrapped around the first godet roll and separator roll 6 to 8 times. From the first godet roll, the yarn is passed to a second driven godet roll, also known as a draw roll, set at 110 to 170° C., coupled with a second separator roll. The yarn is wrapped around the second godet roll and separator roll 6 to 8 times. Draw roll speed is typically 1000 to 4000 m/min while the ratio of draw roll speed to feed roll speed is typically in the range of 1.75 to 3.5. From the draw rolls, the yarn is passed to a third driven godet roll 107, coupled with a third separator roll, operated at room temperature and at a speed 1-2% faster than the roll speed of the second godet roll. The yarn is wrapped around the third pair of rolls 6 to 10 times. From the third pair of rolls, the yarn is passed though an interlace jet 108, and then to a wind-up 109, operated at a speed to match the output of the third pair of rolls.

Yarns formed from filaments made from the compositions disclosed herein can contain other filaments as well. For example, a yarn can contain other filaments of other polyesters, such as, for example polyamides or polyacrylates, and other such filaments as may be desired. The other filaments can optionally be staple fibers. The yarns, which can be formed by the spun-draw process described supra and shown in FIG. 1, or by other spinning processes well-known in the art, is suitable for use as a feed yarn for false twist texturing as commonly practiced in order to provide textile-like aesthetics to continuous polyester fibers. Several types of texturing equipment are well-known in the art. The texturing process comprises a) providing a yarn package as formed according to the spinning process described supra; (b) unwinding the yarn from the package, (c) threading the yarn end through a friction twisting element or false-twist spindle, d) causing the spindle to rotate, thereby imparting twist in the yarn upstream of the rotating spindle and, downstream from the rotating spindle, untwisting the upstream twist, along with the application of heat; and (e) winding the yarn onto a package.

The fibers and yarns are suitable for preparation of fabrics and carpets, as described supra. In one embodiment the filaments are bundled into a plurality of yarns, and the fabric is a woven fabric. In an alternative embodiment, the filaments are bundled into at least one yarn, and the fabric is a knit fabric. In still another embodiment, the fabric is a nonwoven fabric; in a further embodiment the nonwoven fabric is a spunbonded fabric.

A nonwoven fabric, as used herein, is a fabric that is neither woven nor knit. Woven and knit structures are characterized by a regular pattern of interlocking yarns produced either by interlacing (wovens) or looping (knits). Such yarns follow a regular pattern that takes them from one side of the fabric to the other and back, over and over again. The integrity of a woven or knitted fabric is created by the structure of the fabric itself. In nonwovens, most commonly, filaments, typically extruded simultaneously from a plurality of spinnerets, are laid down in a random pattern and bonded to one another by chemical or thermal processes rather than mechanical means. One commercially available example of a nonwoven produced by is Sontara® Spun-Bonded Polyester available from the DuPont Company. In some cases nonwovens can be produced by laying down layers of fibers in a complex three dimensional topological array that does not involve interlacing or looping and in which the fibers do not alternate from one side to the other, as described in Popper et al., U.S. Pat. No. 6,579,815.

Woven fabrics are made with a plurality of yarns interlaced at right angles to each other. The yarns parallel to the length of the fabric are called the "warp" and the yarns orthogonal to that direction are called the "filling" or "weft." Variations in aesthetics can be achieved by variations in the specific ways the yarns are interlaced, the denier of the yarns, the aesthetics, both tactile and visual, of the yarns themselves, the yarn density, and the ratio of warp to filling yarns. As a general rule, the structure of a woven fabric imparts a certain degree of rigidity to the fabric; a woven fabric does not in general stretch as much as a knitted fabric.

In woven fabrics made using yarns of the blend compositions disclosed herein, at least a portion of the warp comprises yarns containing a filament comprising the blend composition. In one embodiment, the aromatic polyester is poly(trimethylene terephthalate) blend with F16-iso-50-co-tere, as defined supra. In one embodiment, both the warp and fill contain a filament comprising the blend composition. In one embodiment, the warp comprises at least 40% by number of yarns comprising the filament comprising the blend composition and at least 40% by number of cotton yarns. In one embodiment the warp comprises at least 80% by number of yarns comprising the filament comprising the blend composition, and the fill comprises at least 80% cotton yarn. As a general rule, there are greater physical demands placed upon warp yarns than fill yarns.

Figure 2A:
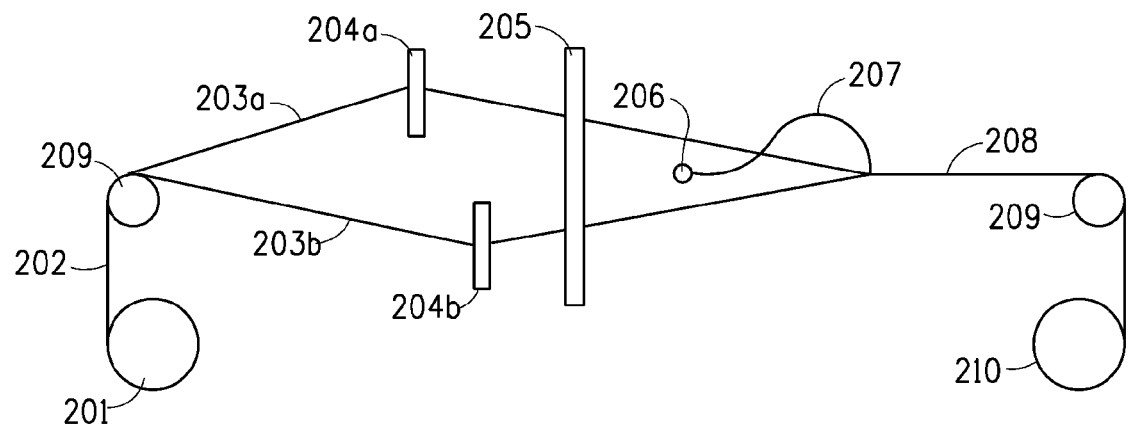
FIGS. 2a-d are schematic drawings of a loom and certain component parts thereof, suitable for use in making fabrics according to embodiments of the invention.
Figure 2B:
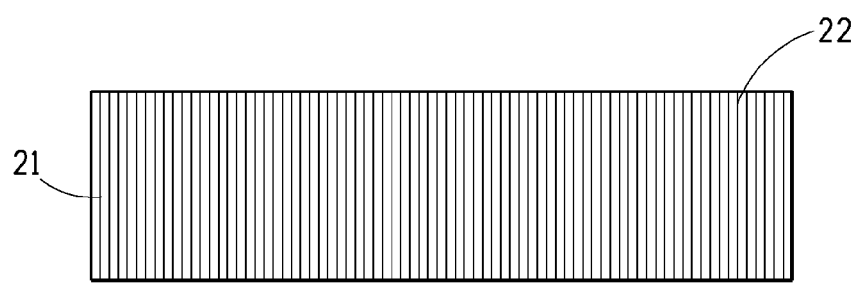
Figure 2C:
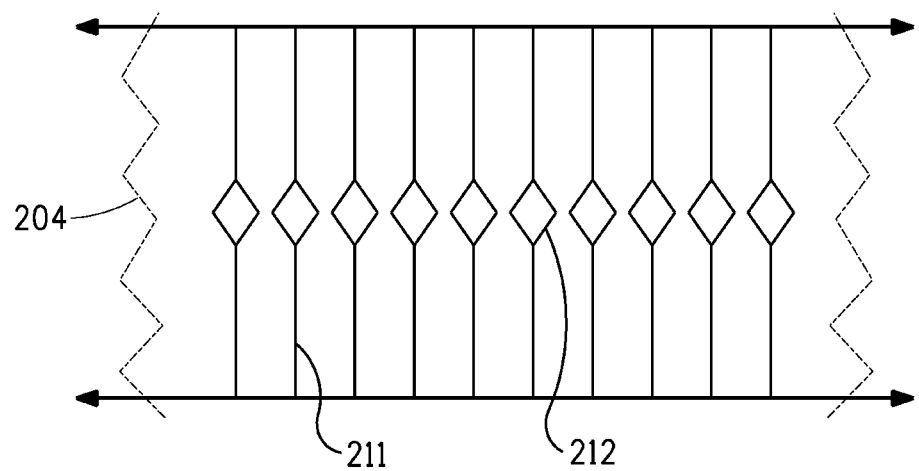
Figure 2D:
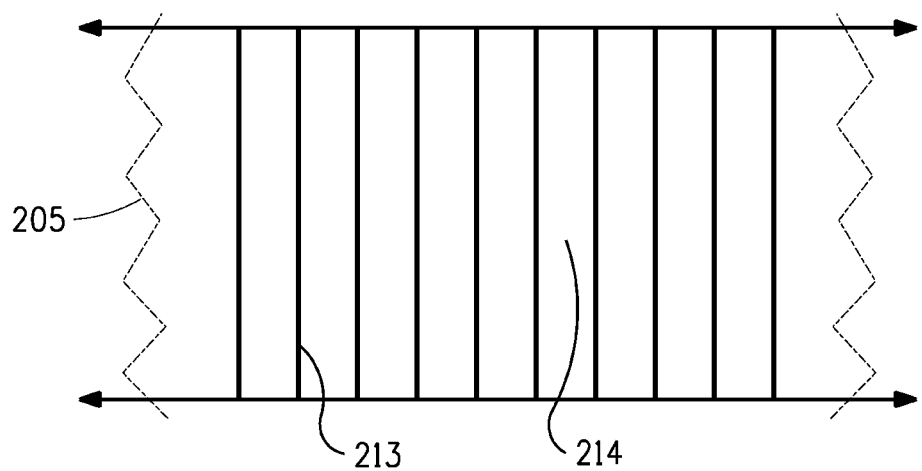

Woven fabrics are fabricated on looms. FIG. 2a is a schematic depiction of an embodiment of a loom, shown in side view. A warp beam, 201, made up of a plurality, often hundreds, of parallel ends, 202, is positioned as the loom feed. Warp beam, 201, is shown in front view in FIG. 2b. Shown in FIG. 2a is a two harness loom. Each harness, 204a, and 204b, is a frame that holds a plurality, often hundreds, of so called "heddles." Referring to FIG. 2c, showing a front, blowup view of a harness, 204, each heddle, 211, is a vertical wire having a hole, 312, in it. The harnesses are disposed to move up or down, one moving up while the other moves down. A portion of the ends, 203a, are threaded through the holes, 212, in the heddles, 211, of upper harness, 204a, while another portion of the ends, 203b, are threaded through the holes in the heddles of lower harness, 204b, thereby opening up a gap between the ends 203a and 203b. In the type of loom shown, a shuttlecock, 206, is impelled by means not shown—typically wooden paddles—to move or shuttle from side to side as the harnesses move up and down. The shuttlecock carries a bobbin of filler yarn, 207, that unwinds as the shuttlecock moves through the gap in the warp ends. A "reed" or "batten," 205, is a frame that holds a series of vertical wires between which the ends pass freely. FIG. 2d shows the reed, 205, in front view depicting the vertical wires, 213, and the spaces between, 214, through which the warp yarns pass. The thickness of the vertical wires, 214, determines the spacing of and therefore density of warp yarns in the crossfabric direction. The reed serves to push the newly inserted filler yarn to the right in the diagram into place in the forming fabric, 208. The fabric is wound onto the fabric beam, 210. The rolls, 209, are guide rolls.

The winding of a warp beam is a precision operation in which typically the same number of yarn packages or spools as the desired number of ends are mounted on a so-called creel, and each end is fed onto the warp beam through a series of precision guides and tensioners, and then the entire warp beam is wound at once.

The specific patterns of interlacing ratios of warp to fill yarns determine the type of woven fabric prepared. Basic patterns include plain weave, twill weave, and satin. Numerous other, fancier woven patterns are also known.

Knitting is the process by which a fabric is prepared by the interlooping of one or more yarns. Knits tend to have more stretch and resilience than wovens. Knits tend to be less durable than wovens. As in the case of wovens, there are many knit patterns, and styles of knitting. In one embodiment, the fabric is a knit fabric comprising yarns comprising a filament comprising the blend composition. In one embodiment, the poly(trimethylene arylate) is poly(trimethylene terephthalate).

In some embodiments, garments can be made from the fabrics. In one embodiment, the poly(trimethylene arylate) is poly(trimethylene terephthalate). The preparation of a garment from a fabric includes preparing a pattern, usually from paper, or in computerized form for automated processes, measuring the required fabric pieces, cutting the fabric to prepare the needed pieces, and then sewing the pieces together according to the pattern. Different styles of fabrics can be combined in garments. In addition to fabrication of garments, the woven, knitted and non-woven fabrics can be employed to fabricate tents, sleeping bags, blankets, tarpaulins, and the like, using known techniques.

The repellency effect depends upon the surface concentration of fluorine. While in no way intended to limit the scope of the invention, it is speculated that the following five factors influence the surface concentration of fluorine:

- The concentration of fluorine in the fluorovinylether functionalized diester. At equal molar-concentrations, it has been found that higher hexadecane contact angle was observed when $F_{16}$-iso was incorporated versus $F_{10}$-iso, defined infra.
- The concentration of the fluorovinylether functionalized comonomer in the copolymer "additive." At similar loadings in the blend, using a higher level of fluorine in the additive better repellency is achieved,
- The concentration of the additive in the blend. For example, a 2 wt-% concentration of 50 mol-% additive provides more repellency than a 1-wt-% concentration of 50 mol-% additive. From the perspective of spinning performance, it is in general desirable to use less of the second aromatic polyester rather than more.
- The molecular weight of the second aromatic polyester vis a vis that of the first aromatic polyester. Presumably the lower the molecular weight of the additive, the more rapidly it will diffuse to the surface at a given temperature. On the other hand, lower molecular weight second aromatic polyester will have a more deleterious effect on spinning performance than one that is higher in molecular weight.
- The temperature/time/pressure history of the melt and the fiber. Experimental results suggest that at atmospheric pressure, heating to a temperature above $T_g$ appears to increase surface fluorine. Higher temperatures are associated with more rapid diffusion. The longer the time, the more time for the molecules to diffuse.

The invention is further described in the following specific embodiments, but not limited thereto.

EXAMPLES

Materials

Purchased from Aldrich Chemical Company, and used as received, were
- dimethyl terephthalate (DMT)
- titanium(IV)isopropoxide
- tetrahydrofuran (THF)
- dimethyl 5-hydroxyisophthalate
- potassium carbonate Obtained from the DuPont Company and used as received, unless otherwise noted.
- Bio based 1,3-propanediol (Bio-PDO™)
- 1,1,1,2,2,3,3-heptafluoro-3-(1,2,2-trifluorovinyloxy) propane (PPVE),
- Sorona® Poly(trimethylene terephthalate) (PTT), bright and semi bright 1.02 IV Purchased from SynQuest Labs, and used as received
- 1,1,1,2,2,3,3-heptafluoro-3-(1,1,1,2,3,3-hexafluoro-3-(1,2,2-trifluorovinyloxy)propan-2-yloxy)propane (PP-PVE)

Testing Methods

Surface Analysis

Electron Spectroscopy for Chemical Analysis (ESCA) was performed using an Ulvac-PHI Quantera SXM spectrometer with a monochromatic Al X-ray source (100 µm, 100 W, 17.5 kV). The sample surface (~1350 µm×200 µm) was first scanned to determine the elements that were present on the surface. High resolution detail spectral acquisition using 55 eV pass energy with a 0.2 eV step size was acquired to determine the chemical states of the detected elements and their atomic concentrations. Typically carbon, oxygen, and fluorine were analyzed at 45° exit angle (~70 Å escape depth for carbon electrons). PHI MultiPak software was used for data analysis.

Surface contact angles were recorded on a. Rame'-Hart Model 100-25-A goniometer (Rame'-Hart Instrument Co) with an integrated DROPimage Advanced v2.3 software system. A micro syringe dispensing system was used for either water or hexadecane. A volume of 4 µL of liquid was used.

The surface tension of yarn and fabric samples was estimated on a relative basis as follows: The specimen was conditioned for 4 hours at 21° C. and 65% relative humidity, after which it was placed on a flat level surface.

Three drops of each of a series of water/ispropanol solutions listed in Table 1 were placed on the surface of the specimen and left for 10 seconds, starting with solution number 1. If no wicking was observed to have occurred to the naked eye, the fabric was rated to have "passing" repellency for that solution. Then the next higher numbered solution was applied. The rating of the test specimen represented the highest numbered solution that did not wick into the test specimen. The surface tension of the solutions decreased with increasing solution number. The lower the surface tension of a liquid that fails to wick into the test specimen, the lower the surface tension of the test specimen.

Similarly, oil repellency was measured using oils with decreasing chain lengths and thus decreasing surface tensions to provide an oil repellency rating between 1-6.

TABLE 1

| Solution No. | % Water | % Isopropanol |
|---|---|---|
| 1 | 98 | 2 |
| 2 | 95 | 5 |
| 3 | 90 | 10 |
| 4 | 80 | 20 |
| 5 | 70 | 30 |
| 6 | 60 | 40 |

Yarn accelerated soil testing was measured according to a modified version of AATCC 123-2000. The method is based upon visual matching under standard lighting of the test specimen with a gray scale. To determine gray scale rating, the specimen was illuminated using a Visual Gray Scale Light Box (Cool White Fluorescent) at a 45° angle. The gray scale rating ranges from 0-5 (5 being excellent, 0 being poor). In the method employed, a 7 cm×10 cm Q-panel aluminum test panel (available from Q-Lab Corporation) was wrapped with about 4 g of the yarn test specimen to cover an area of ca. 6 cm×7 cm. The thus prepared test panel was inserted into diametrically opposed slots along the internal wall of a 74 mm diameter, 126 mm high cylindrical canister, thereby dividing the canister into two compartments. Into each compartment thus formed were inserted 71 g of stainless steel 5/16" diameter ball bearings, and 10 g of pre-soiled 1/8" nylon pellets (soiled according to AATCC 123-1995). The canister was then sealed closed and placed on a lab bench scale mini drum roller configured to rotate the canister about its cylindrical axis. The canister was rotated at 140 rpm for 2.5 minutes. It was then rotated 180° C. about the vertical axis normal to the cylindrical axis thereof (in simple terms, the canister was turned head to tail) and was then rolled for an additional 2.5 minutes at 140 RPM. The test specimen was then removed, the surface thereof cleaned with a vacuum cleaner and evaluated by visual (gray scale) observation.

Molecular Weight by Intrinsic Viscosity

Intrinsic viscosity (IV) was determined using the Goodyear R-103B Equivalent IV method, using T-3, Selar® X250, Sorona®64 as calibration standards on a Viscotek® Forced Flow Viscometer Modey Y-501C. The test specimen was dissolved into a 50/50 wt-% mixture of trifluoroacetic aid and dichloromethane. Solution temperature was 19° C.

Thermal Analysis

Glass transition temperature ($T_g$) and melting point ($T_m$) were determined by differential scanning calorimetry (DSC) performed according to ASTM D3418-08.

Mechanical Properties

Fiber tenacity was measured on a Statimat ME fully automated tensile tester. The test was run according to an automatic static tensile test on yarns with a constant deformation rate according to ASTM D 2256.

Examples 1, 2, and Comparative Example A

A. Synthesis of Dimethyl 5-(1,1,2-trifluoro-2-(perfluoropropoxy)ethoxy) isophthalate ($F_{10}$-iso):

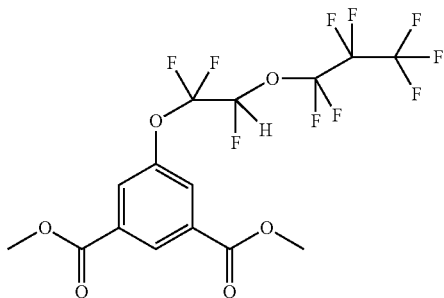 [SMILES: COC(=O)c1cc(OC(F)(F)C(F)OC(F)(F)C(F)(F)C(F)(F)F)cc(C(=O)OC)c1]

In a nitrogen purged dry box, THF (500 mL) and dimethyl 5-hydroxy-isophthalate (42 g, 0.20 mol) were added to an oven-dried round bottom reaction flask equipped with a stirrer and addition funnel. Potassium carbonate catalyst (6.955 g, 0.0504 mol) was added via the addition funnel to form a reaction mixture. Subsequently PPVE (79.8 g, 0.30 mol) was added via the addition funnel and the thus formed reaction mixture was heated to reflux at 66° C. for 16 hours. The catalyst was then removed from the resulting mixture via filtration through a bed of silica gel. The filtrate thus produced was concentrated under vacuum using a rotary evaporator, followed by vacuum distillation to give 81.04 g (85.12% yield) of the desired dimethyl 5-(1,1,2-trifluoro-2-(perfluoropropoxy)ethoxy) isophthalate ($F_{10}$-iso) collected as the distillate.

B. Preparation of copolymer of $F_{10}$-iso with dimethyl terephthalate (DMT) at 50 mol-% concentration and 1,3 propanediol. ($F_{10}$-iso-50-co-tere)

distill off most of the methanol being formed in the reaction. Following the hold period at 210° C., the nitrogen purge was discontinued, and a vacuum was gradually applied in increments of approximately −10 torr every 10 seconds while stirring continued. After about 60 minutes the vacuum leveled out at 50-60 mtorr. The stirring speed was then increased to 225 rpm, and the conditions maintained for 3 hours.

Periodically, the stirring speed was reduced to 180 rpm, and then the stirrer was stopped. The stirrer was restarted, and the applied torque about 5 seconds after startup was measured. When a torque of 25 N/cm or greater was observed, reaction was discontinued by halting stirring and removing the flask from the liquid metal bath. The overhead stirrer was elevated from the floor of the reaction vessel and then the vacuum was turned off and the system purged with $N_2$ gas. The thus formed copolymer product was allowed to cool to ambient temperature and the product recovered after carefully breaking the glass with a hammer. Yield ~90%. $T_g$ was ca. 34° C. $^1$H-NMR (CDCl$_3$) δ: 8.60 (Ar$\underline{H}$, s, 1H), 8.15-8.00 (Ar$\underline{H}$—, m, 2+4H), 7.65 (Ar$\underline{H}$, s, 4H), 6.15 (—CF$_2$—CF$\underline{H}$—O—, d, 1H), 4.70-4.50 (COO—C$\underline{H}_2$—, m, 4H), 3.95 (—C$\underline{H}_2$—OH, t, 2H), 3.85 (—C$\underline{H}_2$—O—C$\underline{H}_2$—, t, 4H), 2.45-2.30 (—C$\underline{H}_2$—, m, 2H), 2.10 (—C$\underline{H}_2$—CH$_2$—O—CH$_2$—C$\underline{H}_2$—, m, 4H).

Results were consistent with preparation of a 50 mol-% trimethylene $F_{10}$-isophthalate copolymer with trimethylene terephalate, designated herein $F_{10}$-iso-50-co-tere.

C. Milling.

The $F_{10}$-iso-50-co-tere copolymer so prepared was chopped into one inch sized pieces that were placed in liquid

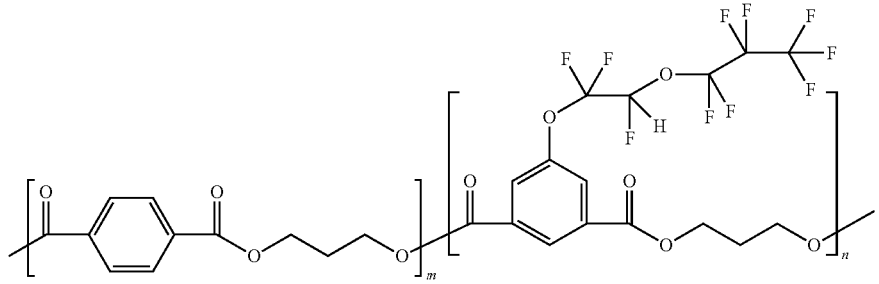

Dimethylterephtalate (12.2 g, 63 mmol), dimethyl 5-(1,1, 2-trifluoro-2-(perfluoropropoxy)ethoxy) isophtalate (30 g, 63 mmol), and 1,3-propanediol (17.25 g, 0.226 mol) were charged to a pre-dried 500 mL three necked round bottom flask fitted with an overhead stirrer and a distillation condenser. A nitrogen purge was applied to the flask which was at 23° C., and stirring was commenced at 50 rpm to form a slurry. While stirring, the flask was evacuated to 100 torr and then repressurized with $N_2$, for a total of 3 cycles. After the first evacuation and repressurization, 13 mg of Tyzor® titanium (IV) isopropoxide available from the DuPont Company was added.

After the 3 cycles of evacuation and repressurization, the flask was immersed into a preheated liquid metal bath set at 160° C. The contents of the flask were stirred for 20 minutes after placing it in the liquid metal bath, causing the solid ingredients to melt, after which the stirring speed was increased to 180 rpm and the liquid metal bath setpoint was increased to 210° C. After about 20 minutes, the bath had come up to temperature. The flask was then held at 210° C. still stirring at 180 rpm for an additional 45-60 minutes to nitrogen for 5-10 minutes, followed by charging to a Wiley mill fitted with a 6 mm screen. The sample was milled at ca. 1000 rpm to produce coarse particles characterized by a maximum dimension of about ⅛". The particles so produced were dried under vacuum and allowed to warm to ambient temperature.

D. Preparation of a Polymer Blend

Sorona® Bright (1.02 dl/g IV) poly(trimethylene terephthalate) (PTT) pellets available from the DuPont Company were dried overnight in a vacuum oven at 120° C. under a slight nitrogen purge. The $F_{10}$-iso-50-co-tere copolymer particles prepared in Section C above were dried overnight in a vacuum oven at ambient temperature under a slight nitrogen purge. Prior to melt compounding the thus dried pellets were combined together to form a first batch with a concentration of 1 wt-% of the $F_{10}$-iso-50-co-tere copolymer in the PTT (Example 1), and a second batch with a concentration of 2 wt-% of the $F_{10}$-iso-50-co-tere copolymer in the PTT (Example 2). Each batch so prepared was mixed in a plastic bag by shaking and tumbling by hand.

Each thus mixed batch was placed into a K-Tron T-20 (K-Tron Process Group, Pittman, N.J.) weight loss feeder feeding a PRISM laboratory co-rotating twin screw extruder (available from Thermo Fisher Scientific, Inc.) equipped with a barrel having four heating zones and a diameter of 16 millimeter fitted with a twin spiral P1 screw. The extruder was fitted with a ⅛" diameter circular cross-section single aperture strand die. The nominal polymer feed rate was 3-5 lbs/hr. The first barrel section was set at 230° C. and the subsequent three barrel sections and the die were set at 240° C. The screw speed was set at 200 rpm. The melt temperature of the extrudate was determined to be 260° C. by inserting a thermocouple probe into the melt as it exited the die. The thus extruded monofilament strand was quenched in a water bath.

Air knives dewatered the strand before it was fed to a cutter that sliced the strand into ~2 mm length blend pellets.

E. Spinning 20 Denier Per Filament Multifilament Yarn

Figure 3:
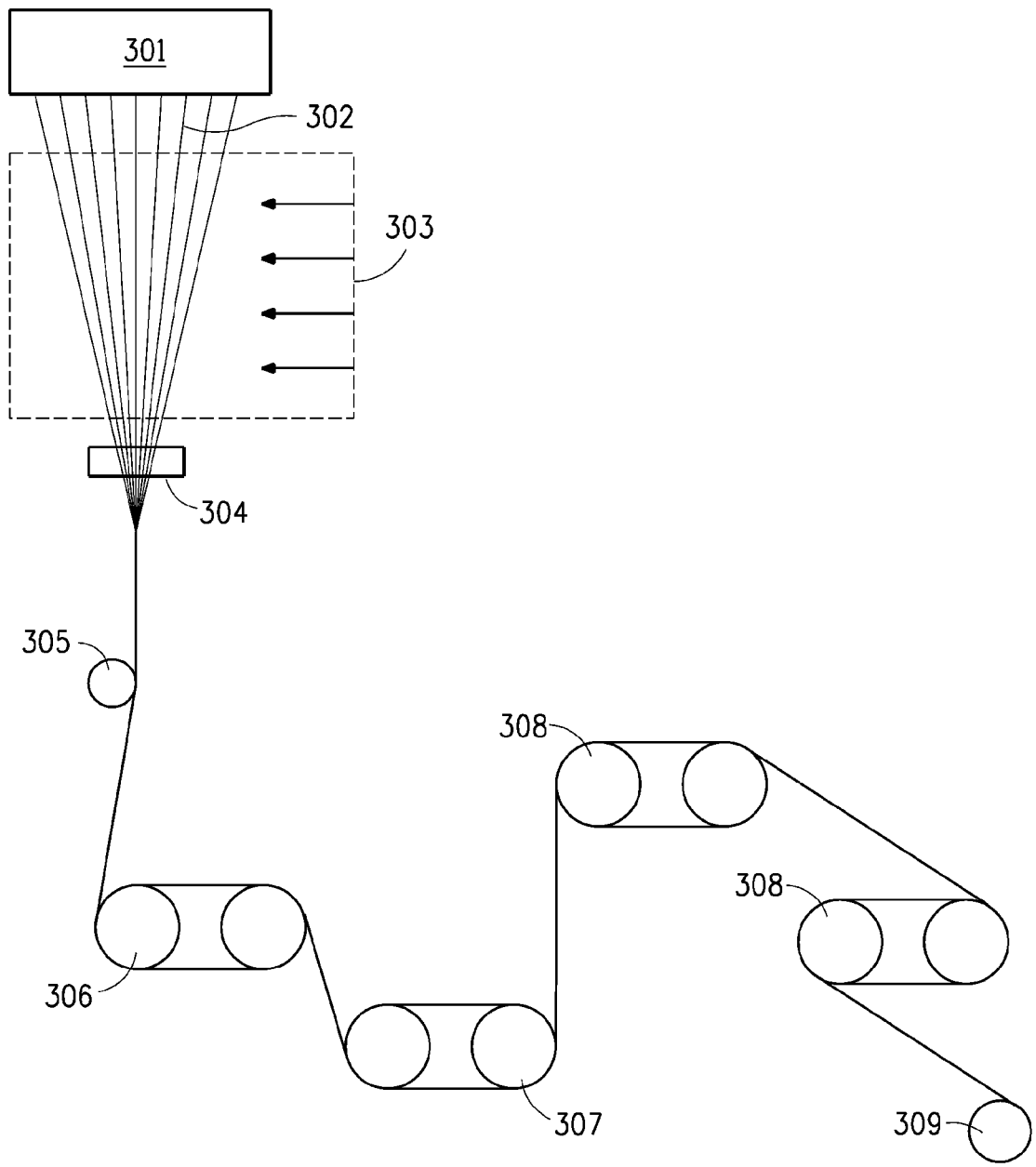
FIG. 3 is a schematic drawing of the melt spinning arrangement for the production of the fibers and yarns of Example 1.

The blend pellets formed in section D were then melt spun into spun-drawn fibers. The blend pellets were fed using a K-Tron weight loss feeder to a 28 millimeter diameter twin screw extruder operating at ca. 30-50 rpm to maintain a die pressure of 600 psi. A Zenith metering pump conveyed the melt f to the spinneret at a throughput rate of 29.9 g/min. Referring to FIG. 3 the molten polymer from the metering pump was forced through a 4 mm glass bead screen to a 10 hole spinneret, 301, heated to 265° C. Each orifice was shaped to provide a filament with a modified delta-type cross section. The specific geometry of the spinneret orifice is described in FIG. 1 of U.S. Published Patent Application 2010/0159186 and the accompanying description. The filamentary streams leaving the spinneret, 302, were passed into an air quench zone, 303, where they were impinged upon by a transverse air stream at 21° C. The filaments were then passed over a spin finish head, 304, where a spin finish was applied, and the filaments were converged to form a yarn. The yarn so formed was conveyed via a tensioning roll, 305, onto two feed rolls (godets), 306, heated to 55° C. and spinning at 500 rpm and then onto two draw rolls (godets), 307, heated to 160° C. and spinning at 1520 rpm. From the draw rolls, 307, the filaments were passed onto two pair of let-down rolls, 308, operating at ambient temperature and collected on a winder, 309, at 1520 rpm. The extruder was provided with 9 barrel sections of which the first section was kept at 150° C. and the subsequent sections at 255° C. The spinneret pack (top and band) was set at 260° C. and the die at 265° C. Results are shown in Table 2. A control sample, Comparative Example A (CE-A) of unblended Sorona® Bright was also spun into fiber.

The fibers so prepared were particularly well-suited for use in the preparation of carpets.

TABLE 2

| Example | Yarn denier | DPF |
|---------|-------------|------|
| CE-A    | 182         | 18.2 |
| 1       | 185         | 18.5 |
| 2       | 185         | 18.5 |

Examples 3, 4, and Comparative Example B

A. Synthesis of (Dimethyl 5-(1,1,2-trifluoro-2-(1,1,2,3,3,3-hexafluoro-2-(perfluoropropoxy)propoxy)ethoxy) isophthalate ($F_{16}$-iso):

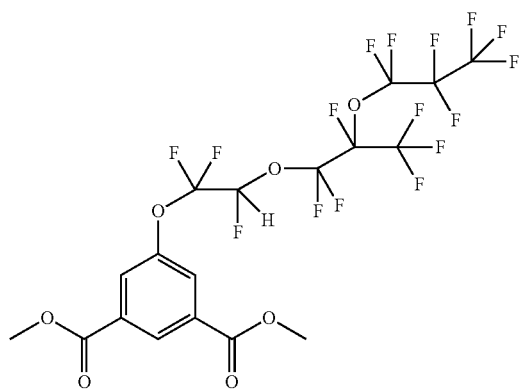 [SMILES: COC(=O)c1cc(OC(F)(F)C(F)OC(F)(F)C(F)(OC(F)(F)C(F)(F)C(F)(F)F)C(F)(F)F)cc(C(=O)OC)c1]

The procedures of Example 1 section A were repeated except that 129.6 g of PPPVE were employed in place of the PPVE of Example 1 section A. 123.39 g (96.10% yield) of the desired product, (dimethyl 5-(1,1,2-trifluoro-2-(1,1,2,3,3,3-hexafluoro-2-(perfluoropropoxy)propoxy)ethoxy)isophthalate ($F_{16}$-iso) were collected as the distillate.

B. Preparation of copolymer of $F_{16}$-iso with dimethyl terephthalate (DMT) at 50 mol-% concentration and 1,3 propanediol. ($F_{10}$-iso-50-co-tere)

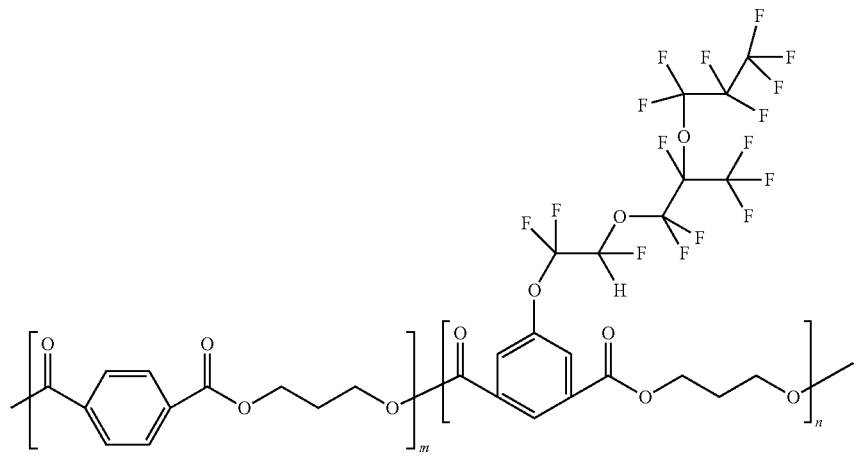

Dimethylterephtalate (36.24 g, 0.187 mmol), $F_{16}$-iso (120 g, 0.187 mol), and 1,3-propanediol (51.2 g, 0.672 mol) were charged to a pre-dried 500 mL three necked round bottom flask fitted with an overhead stirrer and a distillation condenser. A nitrogen purge was applied to the flask which was at 23° C., and stirring was commenced at 50 rpm to form a slurry. While stirring, the flask was evacuated to 100 torr and then repressurized with $N_2$, for a total of 3 cycles. After the first evacuation and repressurization, 48 mg of Tyzor® titanium (IV) isopropoxide was added.

The polymerization reaction was then conducted as described in Example 1 section B except that the hold period at 210° C. was 90 minutes instead of 45-60 minutes. The thus formed product was allowed to cool to ambient temperature and the reaction vessel was removed and the product recovered after carefully breaking the glass with a hammer. Yield ~90%. $T_g$ was ca. 24° C. $^1$H-NMR (CDCl$_3$) δ: 8.60 (Ar$\underline{H}$, s, 1H), 8.15-8.00 (Ar$\underline{H}$—, m, 2+4H), 7.65 (Ar$\underline{H}$, s, 4H), 6.15 (—CF$_2$—CF$\underline{H}$—O—, d, 1H), 4.70-4.50 (COO—C$\underline{H}_2$—, m, 4H), 3.95 (—C$\underline{H}_2$—OH, t, 2H), 3.85 (—C$\underline{H}_2$—O—C$\underline{H}_2$—, t, 4H), 2.45-2.30 (—CH$_2$—, m, 2H), 2.10 (—C$\underline{H}_2$—CH$_2$—O—CH$_2$—C$\underline{H}_2$—, m, 4H).

Results were consistent with preparation of a 50 mol-% trimethylene $F_{16}$-isophthalate copolymer with trimethylene terephalate, designated herein $F_{16}$-iso-50-co-tere.

C. Milling of $F_{16}$ iso-50-co-tere.

The milling procedures of Example 1 section C were replicated. The particles so produced were dried under vacuum and allowed to warm to ambient temperature.

D. The methods of Example 1 section D were replicated to form the melt blend of Sorona® Bright (I.V.=1.02 dl/g) with the $F_{16}$-iso-50-co-tere. Blends of 1 (Example 3) and 2 (Example 4) wt-% concentration were formed as in Example 1.

E. The blend pellets prepared in Examples 3 and 4 section D above were fed to the 28 mm extruder, as in Example 1. The procedures of Example 1 Section E were replicated to form 10 filament, approximately 20 dpf yarns. Conditions that differed from Example 1 are shown in Table 3. A sample of Sorona® Bright with no fluorovinylether isophthalate copolymer added was used as Comparative Example B (CE-B). Tensile test results are shown in Table 4.

The yarns so produced had particular utility for the preparation of carpets.

About 6.5 g of the yarn of Example 4 was back wound to a stainless steel wire mesh bobbin at 150 rpm. The so collected yarn was scoured three times in 65-70° C. heated water for 5 minutes (water was replaced between each scour) and subsequently dried for 30 minutes at 50° C. and allowed to air dry for 48 hours prior to soil evaluation. Soil repellency was then determined according to the method described supra. Results comparing the yarn of CE-B with that of Example 4, scoured and unscoured, are shown in Table 5.

ESCA was also used to determine the surface concentration of fluorine in the test yarns. With the exit angle set at 45° the fluorine content of the scoured yarn of Example 4 was found to be 4.6 atom-%—more than 10 times the calculated bulk concentration. Results are shown in Table 5. Note that ESCA was not performed on CE-B. Since the control had no fluorine in it to begin with, it is assumed that there would be no detectable amount on the surface.

TABLE 3

| Example | Yarn denier | DPF | Draw ratio | Feed Rolls Speed (m/min) | Draw Rolls Speed (m/min) | Winder Speed (m/min) |
|---|---|---|---|---|---|---|
| CE-B | 189 | 18.9 | 3.0 | 507 | 1521 | 1495 |
| 3 | 186 | 18.6 | 2.8 | 535 | 1500 | 1495 |
| 4 | 173 | 17.3 | 2.8 | 535 | 1500 | 1495 |

TABLE 4

| Example | Modulus[1] (g/denier) | Elongation (%) | Tenacity (g/denier) |
|---|---|---|---|
| CE B | 22 ± 0.3 | 58.2 ± 11.5 | 2.11 ± .56 |
| 3 | 22.9 ± 0.5 | 55.2 ± 9.8 | 1.88 ± 0.37 |
| 4 | 21.5 ± 0.5 | 50.1 ± 9.2 | 1.66 ± 0.27 |

TABLE 5

| Sample | Accelerated soil test, gray scale (0-5) | Water repellency, kit test (1-6) | Surface Fluorine (atom %) |
|---|---|---|---|
| Comparative example, Sorona ® bright as spun. | 1 | 0 | N.A. |
| Comparative example, Sorona ® bright, scoured. | 2 | 0 | N.A. |
| Blend of Sorona ® bright with 2 wt-% 50 mol % $F_{16}$-iso copolymer, as spun (Example 4). | 1 | 0 | 2.5 |
| Blend of Sorona ® bright with 2 wt-% 50 mol % $F_{16}$-iso copolymer, scoured (Example 4). | 3-4 | 3 | 4.5 |

Examples 5 and 6 and Comparative Example C

Steps A-D of Example 3 were repeated to produce two batches of blends of the $F_{16}$-iso and Sorona Bright prepared as described in Example 3, one with 1% by weight of $F_{16}$-iso-50-co-tere (Example 5) and one with 2% by weight of $F_{16}$-iso-50-co-tere (Example 6).

Each blend was melt spun into yarn following the procedures of Example 3 Section E except that the spinneret had 34 holes each of circular cross-section, 0.010 inches in. diameter×0.040 inches in length. A sample of unblended Sorona® Bright was used as a control (CE-C). Spinning conditions are shown in Table 6. Mechanical properties of the yarns are shown in Table 7.

The yarns so produced are particularly suitable in the preparation of knit, woven, and non-woven textile goods.

TABLE 6

| Example | Yarn denier | DPF | Draw ratio | Feed roll (m/min) | Draw roll (m/min) | Winder (m/min) | Temp Feed roll (°C.) | Temp Draw roll (°C.) |
|---|---|---|---|---|---|---|---|---|
| CE C | 77 | 2.2 | 3.0 | 733 | 2200 | 2025 | 65 | 130 |
| 5 | 75 | 2.2 | 3.0 | 733 | 2200 | 2025 | 65 | 130 |
| 6 | 74 | 2.1 | 3.0 | 733 | 2200 | 2025 | 65 | 130 |

TABLE 7

| Example | Elastic Modulus (gpd) | Elongation (%) | Tenacity (g/denier) |
|---|---|---|---|
| CE-C | 25.2 ± 0.2 | 28.6 ± 0.7 | 3.3 ± 0.2 |
| 5 | 24.7 ± 0.1 | 29.5 ± 2.4 | 3.1 ± 0.1 |
| 6 | 24.4 ± 0.1 | 32.4 ± 5.3 | 3.1 ± 0.2 |

Example 7

Step A was the same as in Example 1

B. Dimethylterephtalate (DMT, 130 g, 0.66 mol), $F_{10}$-iso (6.5 g, 13.6 mmol, 5 wt-% to DMT or 2 mol %), and 1,3-propanediol (90.4 g, 1.19 mol) were charged to a pre-dried 500 mL three necked round bottom flask. An overhead stirrer and a distillation condenser were attached. The reactants were stirred under a nitrogen purge at a speed of 50 rpm. The condenser was kept at 23° C. The contents were degassed three times by evacuating to 100 torr and refilling back with $N_2$ gas. 42 mg of titanium(IV) isopropoxide catalyst was added after the first evacuation. The flask was immersed into a preheated metal bath set at 160° C. The solids were allowed to completely melt with stirring at 160° C. for 20 minutes after which the stirring speed was slowly increased to 180 rpm. The temperature set-point was increased to 210° C. and maintained for 90 minutes to distill off most of the formed methanol. The temperature set-point was then increased to 250° C. after which the nitrogen purge was closed and a vacuum ramp started. After about 60 minutes the vacuum reached a value of 50-60 mtorr. As the vacuum stabilized the stirring speed was increased to 225 rpm and the reaction held for 4 hours. The torque was monitored as described in Example 1 and the reaction was typically stopped when a value of 100 N/cm² or greater was reached. The polymerization was stopped by removing the heat source. The over head stirrer was elevated from the floor of the reaction vessel before the vacuum was turned off and the system purged with $N_2$ gas. The product was recovered after carefully breaking the glass with a hammer. $T_g$ was ca. 51° C., $T_m$ was ca. 226° C. IV was ca. 0.88 dL/g.

Step C was the same as in Example 1

Figure 4:
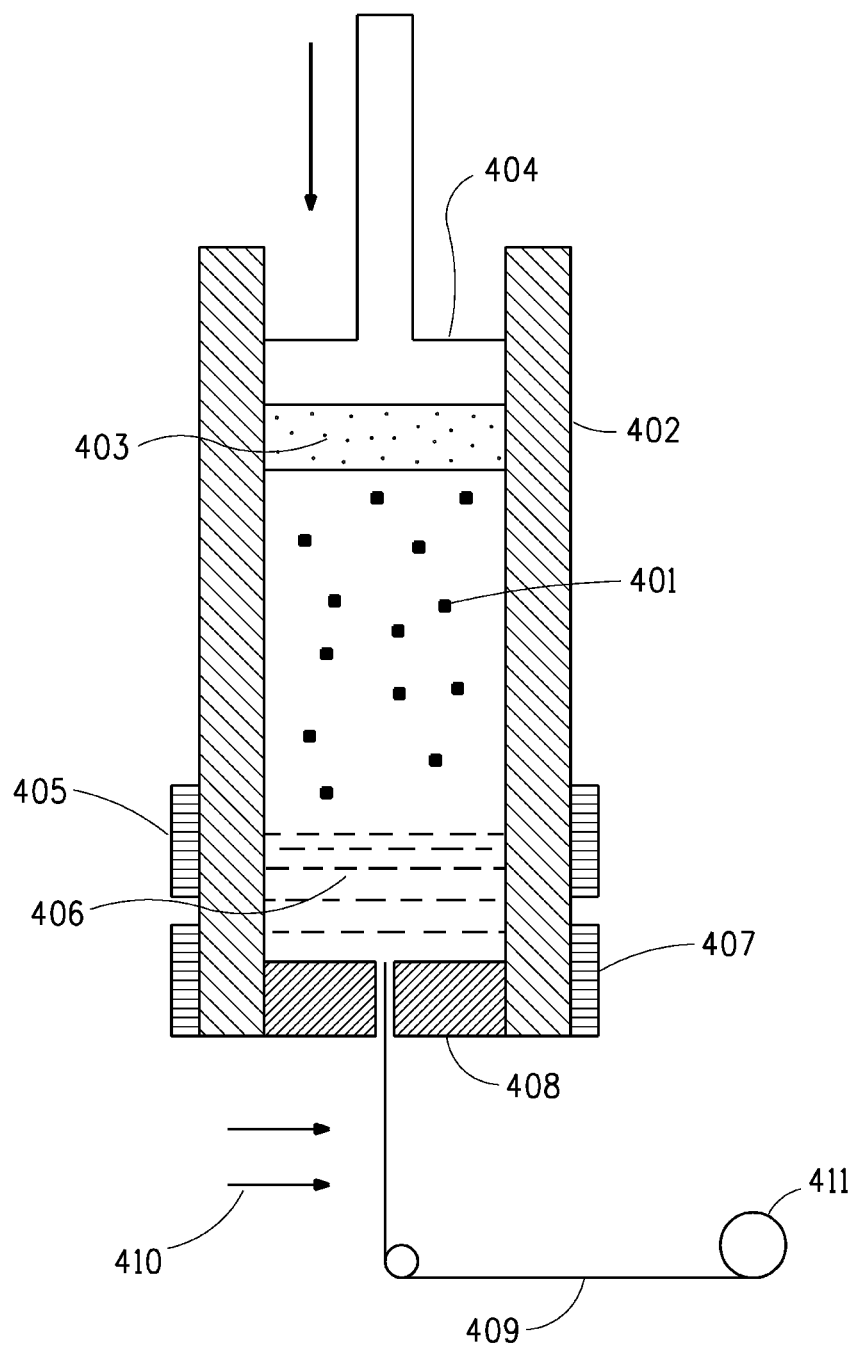
FIG. 4 is a schematic drawing of the press-spinning apparatus used for the production of the fiber of Example 7.

D. Referring to FIG. 4, the cryogenically milled particles of polymer, 401, were charged to a steel cylinder, 402, and topped of with a Teflon® PTFE plug, 403. A hydraulically driven piston, 404, compressed the particles, 401, into a melting zone provided with a heater and heated to 260° C., 405, where a melt, 206, was formed, and the melt then forced into a separately heated, 407, round cross-section single-hole spinneret, 408, heated to 265° C. Prior to entering the spinneret, the polymer passed through a filter pack, not shown. The melt was extruded into a single strand of fiber, 409, 0.3 mm in diameter at a rate of 0.9 g/min. The extruded fiber was passed through a transverse air quench zone, 410, and thence to a wind-up, 411, operated at 500 m/min take-up speed. A control fiber of Sorona® Bright was also spun under identical conditions. In general, single filaments were produced for 30 minutes and in each case the filament spun smoothly without breaks. The resulting fiber was flexible and strong as determined by pulling and twisting by hand.

Examples 8

Step A was the same as in Example 2

B. The procedures and materials and weights of materials of Example 7 employed for forming the copolymer with DMT and 1,3-propanediol were followed, except that 6.5 g of $F_{16}$-iso of Step A above was substituted for the 6.5 g of $F_{10}$-iso in Example 7. $T_g$ was ca. 51° C., $T_m$ was ca. 226° C. IV was ca. 0.86 dL/g.

Step C was the same as in Example 1

D. The melt press spinning procedures of Example 7 were repeated exactly except that the $F_{16}$-iso-1.5-co-tere particles prepared in Step C above were employed. The resulting fiber was flexible and strong as determined by pulling and twisting by hand.

Examples 9, 10, 11 and 12

A. To a 20 liter vessel equipped with a condenser and stirring rod were charged THF (12 L), dimethyl 5-hydroxy-isophthalate (2210 g), potassium carbonate (363 g), and PPPVE (5000 g) and the mixture brought to a reflux (jacket temperature 70° C., pot temperature 63° C.) and left stirring for 10 hours. The reaction mixture was then filtered to remove the potassium carbonate. THF was then extracted from the filtrate by rotary evaporation. The remaining solution was distilled under vacuum (jacket temperature 215° C., pot temperature 152° C., pressure 2.2 torr) and dimethyl 5-(1,1,2-trifluoro-2-(perfluoropropoxy)ethoxy) isophthalate ($F_{10}$-iso) collected as the distillate. Yield was 5111 g (71%).

B. DMT (1080 g), the $F_{16}$-iso (3572 g) prepared in Section A above, 1,3-propanediol (1521 g), and titanium (IV) isopropoxide (2.83 g) were charged to a 10-lb stainless steel stirred autoclave (Delaware valley steel 1955, vessel #: XS 1963) equipped with a stirring rod and condenser. A nitrogen purge was applied and stirring was commenced at 50 rpm to form a slurry. While stirring, the autoclave was subject to three cycles of pressurization to 50 psi of nitrogen followed by evacuation. A weak nitrogen purge (~0.5 L/min) was then established to maintain an inert atmosphere. While the autoclave was heated to the set point of 225° C. methanol evolution began at a batch temperature of 185° C. Methanol distillation continued for 120 minutes during which the batch temperature increased from 185° C. to 220° C. When the temperature leveled out at 220° C., a vacuum ramp was initiated that during 60 minutes reduced the pressure from 760 torr to 300 torr (pumping through the column) and from 300 torr to 0.05 torr (pumping through the trap). The mixture, when at 0.05 torr, was left under vacuum and stirring for 5 hours after which nitrogen was used to pressurize the vessel back to 760 torr. The formed polymer was recovered by pushing the melt through an exit valve at the bottom of the vessel. Yield was ca. 10 lbs (ca. 95. $T_g$ was ca. 24° C. $^1$H-NMR (CDCl$_3$) δ: 8.60 (ArH, s, 1H), 8.15-8.00 (ArH—, m, 2+4H), 7.65 (ArH, s, 4H), 6.15 (—CF$_2$—CFH—O—, d, 1H), 4.70-

4.50 (COO—C$\underline{H}_2$—, m, 4H), 3.95 (—C$\underline{H}_2$—OH, t, 2H), 3.85 (—C$\underline{H}_2$—O—C$\underline{H}_2$—, t, 4H), 2.45-2.30 (—C$\underline{H}_2$—, m, 2H), 2.10 (—C$\underline{H}_2$—C$\underline{H}_2$—O—C$\underline{H}_2$—C$\underline{H}_2$—, m, 4H).

C. Sorona® Semi Bright (1.02 dL/g IV) PTT pellets were dried overnight in a hopper at 120° C. under a slight nitrogen purge. The $F_{16}$-iso-50-co-tere copolymer prepared in Section B above was cut into rectangular slabs (2.5×2.5×20 cm) and dried overnight in a vacuum oven at ambient temperature under a slight nitrogen purge. Pellets of neat Sorona® Semi bright (1.02 dL/g?) were weight-loss fed to a 28/30 mm co-rotating twin screw extruder equipped with 9 barrel segments. To barrel section #4 was attached the output of a Bonnet single screw melt feeder which metered the $F_{16}$-iso-50-co-tere copolymer into the twin screw extruder. The temperature of the Bonnet feeder was kept at 150° C. and the rate of feed set at position #2. The feed rates were adjusted to yield a master batch blend of 20 wt-% of $F_{16}$-iso-50-co-tere in the Sorona® Semi bright melt. The resulting melt blend was extruded through a circular cross section ¼" diameter single aperture strand die. The nominal polymer throughput rate was 30-50 lbs/hr.

The first barrel section of the extruder was set at 230° C., the subsequent three barrel sections set at 240° C., the subsequent barrel section set at 230° C., the subsequent three barrel sections and the die were set at 225° C. The screw speed was set at 250 rpm. The extruded monofilament strand was quenched in a water bath. Air knives dewatered the strand before it was fed to a cutter that sliced the strand into ~2 mm length blend pellets.

Neat Sorona® Semi Bright and the master batch prepared above were separately weight-loss fed to a twin screw extruder to prepare a pelletized blend composition comprising 2 wt-% (Example 12) of F16-iso-50-*co*-tere additive in Sorona® Semi Bright.

D. The blend pellets formed in section C were then melt spun into bulked continuous filament (BCF) yarn that is particularly well-suited for preparation of carpets. In Examples 9, 10, and 11, neat Sorona® Semi-Bright was placed into one weigh-loss feeder, and the masterbatch prepared as described supra was placed into another weight loss feeder. The two weight-loss feeders fed their respective pellets to the feed throat of a single screw spinning extruder at the feed ratios to provide a melt having 1,2, and 4 wt-% respectively of the F16-iso-50-*co*-tere, and this melt was extruded into fibers, as described infra. In Example 12, the masterbatch and the neat sorona were first melt blended in a twin screw extruder to produce a pelletized blend of 2 wt-% F16-iso-50-*co*-tere. Those 2 wt-% blend pellets were then fed to the single screw spinning extruder.

Figure 5:
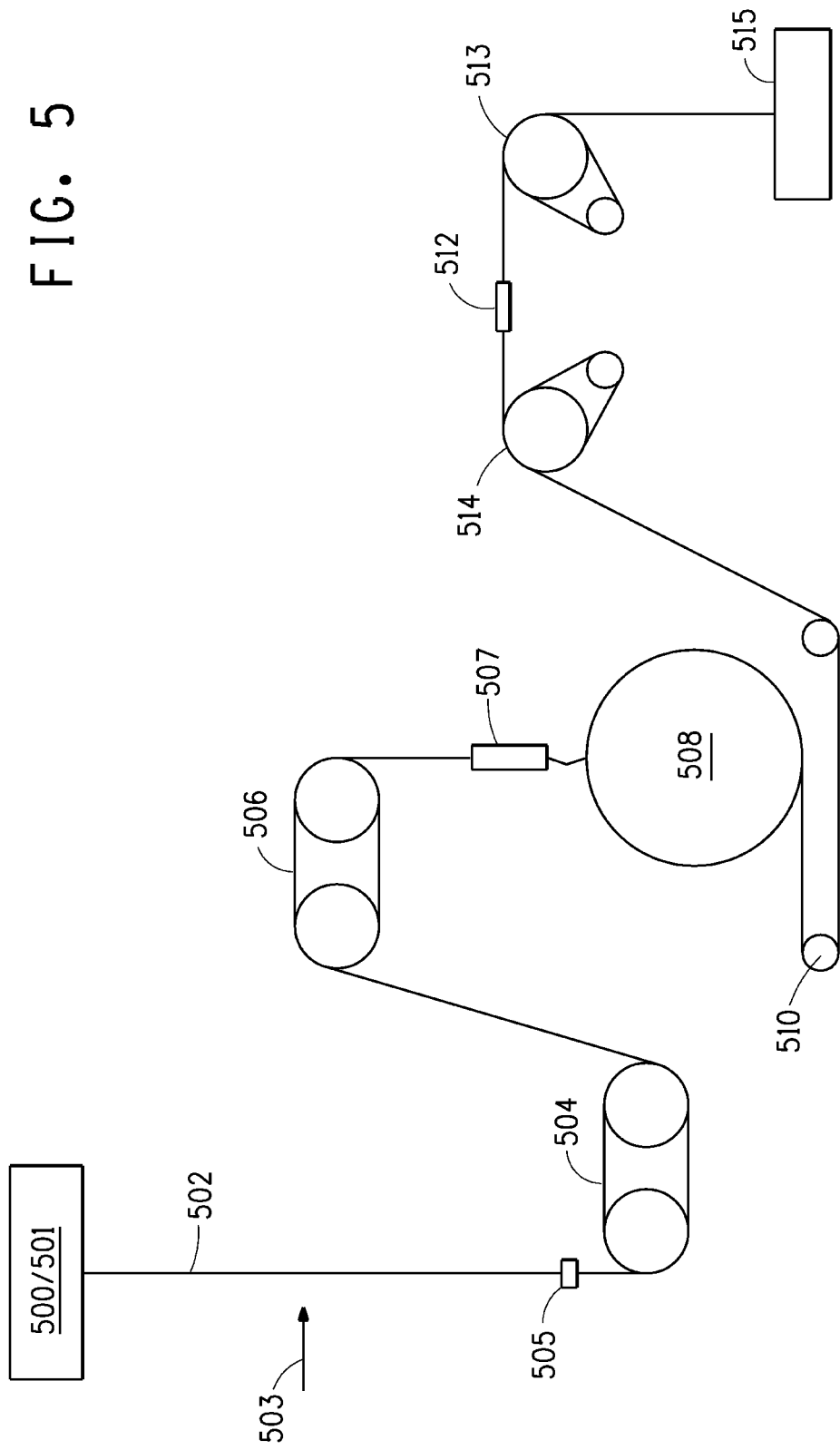
FIG. 5 is a schematic drawing of the apparatus employed in Examples 9-12 to produce bulked continuous filament yarn suitable for use in preparation of carpet.

FIG. 5 is a schematic diagram of a spinning arrangement for manufacturing of the bulked continuous filaments. Polymer blend pellets prepared in C above were fed individually (Example 12), or from the master batch in combination with neat Sorona Semi Bright (Examples 9, 10 and 11) into a 45 mm single screw extruder with four heat zones of which zone 1 was kept at 255° C. and zones 2-4 kept at 260° C. and the thus formed melt pumped via gear pump through a spin pack assembly, 500, that included a spinneret, 501, plate having 70 orifices designed to produce filaments with modified delta cross-sections, as described supra. The spin pack assembly also contained a filtration medium. Filaments, 502, were spun when polymer was extruded through the spinneret plate and filaments are pulled through a quench, 503, chimney (air with ca. 77% relative humidity) by feed rolls, 504, Finish, 505, is applied to the filaments by a finish roll located upstream from the feed rolls. The feed rolls were set at 60° C. From the feed rolls, the yarn was passed to draw rolls, 306, heated to 150° C. Air heated to 200° C. was impinged by bulking jet, 507. The resulting bulked filaments were laid on a rotating stainless steel drum 508 heated to 80° C. having a perforated surface. The filaments were cooled under zero tension by pulling air through them using a vacuum pump, 509. After the filaments were cooled the filaments were pulled off the drum, 510 . . . . The filament bundle was interlaced, 512, periodically by an interlacing jet disposed between a pull roll 513, and a let down roll, 514, and collected by a winder, 515.

Conditions are shown in Table 8 below. A sample of Sorona® Bright with no fluorovinylether isophthalate copolymer added was used as Comparative Example D (CE-D). Tensile test results are shown in Table 9 below.

TABLE 8

| Example | Additive | Draw ratio | Feed Rolls Speed (m/min) | Draw Rolls Speed (m/min) | Winder (m/min) Speed (m/min) |
|---|---|---|---|---|---|
| CE-D | none | 3 | 990 | 2970 | 2422 |
| 9 | 1 wt-% let down * | 3 | 990 | 2970 | 2437 |
| 10 | 2 wt-% let down * | 2.8 | 1042 | 2920 | 2465 |
| 11 | 4 wt-% let down * | 3 | 990 | 2970 | 2512 |
| 12 | 2 wt-% compound | 3 | 990 | 2970 | 2520 |

TABLE 9

| Example | Additive | Elongation (%) | Tenacity (g/denier) |
|---|---|---|---|
| CE D | none | 48 | 2.7 |
| 9 | 1 wt-% let down | 47 | 2.6 |
| 10 | 2 wt-% let down | 50 | 2.4 |
| 11 | 4 wt-% let down | 48 | 2.4 |
| 12 | 2 wt-% compound | 48 | 2.3 |

Example 13

Steps A-D was the same as in Example 9 above. The produced BCF yarn was back wound onto 48 cones. The yarn that was prepared in Examples 9-12 and Comparative Example D was back wound onto 48 cones each. Back winding was done on each individual set of yarn of Ex. 9, 10, 11, 12, above, and CE D by running the cones on a cone winder for 3-5 minutes at 100 m/min to transfer ~300-500 m from the main bobbin onto each individual cone. Tufting was done on a 48 end Venor tufting machine (Daniel Almond Ltd., Union Works, Waterfront, Lancashire, England). At least 10 inches of yarn was pulled through each needle so that the tension could be kept during start up. The backing (36" 18 PK beige PolyBac from Propex) was inserted under the needles and through the top and bottom feed rollers. While holding tension of the threaded yarn the treadle was engaged by a foot pedal connected with the motor. After release of the yarn, the backing was manually guided from its edges. When the desired length was complete the foot pedal was released and the thus prepared sample cut, initial pass ~3.5×50". The obtained carpet sample was white in color, soft and with a basis weight of ca. 1090 g/m².

Example 14 and Comparative Example E

Knitted hose leg samples were produced from the yarn of Example 6 and CE-C on a FAK (Lawson-Hemthill) circular knitting machine. A 75 gage needle was used, 380 heads, and with 35 needles/inch using a low throughput.

The knitted samples were dyed blue using an Atlas LP-1 Laundrometer, Book centrifugal extractor, and Whirlpool automatic dryer. For the dyeing bath, water (30×mass of fabric) and disperse Blue 27 dyestuff (2 wt-% relative to the weight of fabric) was charged in a steel can vessel and the pH adjusted to 4.5-5 using acetic acid. The fabric was added and the can placed in the Laundrometer which was sealed using a lid with rubber and Teflon gaskets. The Laundrometer was run for 30 minutes at 121° C. The fabric was removed, rinsed in hot water, centrifuged to extract the excess water, and dried in the automatic dryer.

Water and oil repellency of the blue dyed knitted fabric were characterized using the method described, supra. The neat PTT fiber control was compared with a fabric prepared from the yarn of Example 6 containing at 2 wt-%. One specimen of each fabric was subject to a post-dyeing heat treatment at 121° C. for 20 minutes. Results are summarized in the Table 10:

TABLE 10

| Fabric Sample | | Water repellency | Oil repellency |
|---|---|---|---|
| CE-E | After dyeing | 0 | 0 |
| CE-E | After dyeing and post-dyeingheat treatment | 0 | 0 |
| Example 14 | After dyeing | 0 | 0 |
| Example 14 | After dyeing and post-dyeingheat treatment | 3 | 1 |

Example 15 and 16 and Comparative Example F

The yarns of Example 5, 6 and Comparative Example C were woven in a 2×1 twill samples were prepared on a CCI sample weaving system with integrated sizing, warping and weaving. Sizing was performed by running the yarn through a 50/50 volume-% water/polyvinyl alcohol bath and subsequently dried over heated air (T=80° C.). The warp was made by applying the yarn around a 5 yard circumference (20" wide) warp drum. The warp was taken off the drum, cut and mounted on a flat tape lease. The ends were drawn into a single heddle eye and into the reed. The weaving pattern was now drawn into the loom, i.e. the warp drum, harness and reed were placed in the loom and the weaving conducted . . . . The fabric thus produced was taken up on a take up roll.

The as-made woven sample was scoured to remove the PVA sizing. The sample was scoured three times in heated 65-70° C. water for 5 minutes (water was replaced between each scour) and subsequently dried for 30 minutes at 50° C. and allowed to air dry for 48 hours prior to water repellency evaluation. The water repellency performance of the thus scoured fabric was characterized according to the method described supra. Results are shown in Table 11.

TABLE 11

| | water repellency |
|---|---|
| CE-F | 1 |
| Example 15 (1%) | 3 |
| Example 16 (2%) | 2 |

Example 16

The yarns of Example 5, 6 and Comparative Example C were used to produce knitted samples on a Mayer CIE OVJ 1.6E3 wt 18 gauge Jacquard Double Knit, 34 feeds. The stitch number on the cylinder needles was set at 12. The stitch number on the dial needles was set at 12. The Dial height was 1.5 mM. The timing was 4 needles advance. The packages were broken down on a back winder and a very small stitch was pulled. The soft, off-white 300×82 cm fabric produced had good stretch with a basis weight of 130 g/m².

We claim:

1. A blend composition comprising a first aromatic polyester selected from the group consisting of poly(trimethylene terephthalate) (PTT), poly(ethylene naphthalate) (PEN), poly(ethylene isophthalate), poly(trimethylene isophthalate), poly(butylene isophthalate), mixtures thereof, and copolymers thereof, and a second aromatic polyester in contact therewith, wherein the second aromatic polyester is present in the composition at a concentration in the range of 0.1 to 10% by weight of the total composition; and, wherein the second aromatic polyester comprises a molar concentration in the range of 40 to 100 mol-% of fluorovinylether functionalized repeat units represented by structure I

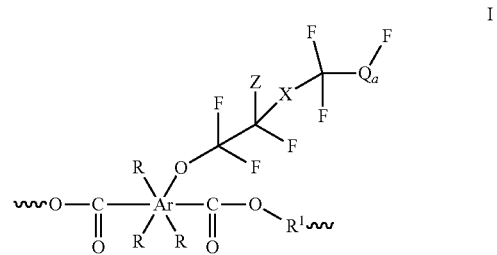

wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by structure II

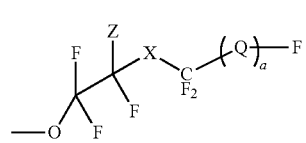

with the proviso that only one R can be OH or the radical represented by the structure (II) II;
$R^1$ is a $C_2$-$C_4$ alkylene radical which can be branched or unbranched;
X is O or $CF_2$;

Z is H or Cl;
a=0 or 1;
and,
Q represents structure Ia $$\begin{array}{c} \mathrm{F} \\ -\mathrm{C}-\mathrm{Rf}^1- \\ | \\ [\mathrm{Y}-\mathrm{Rf}^2\,]_q-\mathrm{F} \end{array} \quad \text{Ia}$$

wherein q=0-10;
Y is O or $CF_2$;
$Rf^1$ is $(CF_2)n$, wherein n is 0-10;
and,
$Rf^2$ is $(CF_2)_p$, wherein p is 0-10, with the proviso that when p is 0, Y is $CF_2$.

2. The composition of claim 1 wherein the first aromatic polyester is poly(trimethylene terephthalate).

3. The composition of claim 1 wherein the second aromatic polyester the fluorovinylether functionalized repeat unit represented by the structure I is dimethyl 5-(1,1,2-trifluoro-2-(1,1,2,3,3,3-hexafluoro-2-(perfluoropropoxy)propoxy)ethoxy) isophthalate.

4. The composition of claim 3 wherein the dimethyl 5-(1,1,2-trifluoro-2-(1,1,2,3,3,3-hexafluoro-2-(perfluoropropoxy)propoxy)ethoxy) isophthalate is present at a molar concentration in the range of 40 to 60 mol-%.

5. The composition of claim 1 wherein the second aromatic polyester the fluorovinylether functionalized repeat unit represented by the structure I is dimethyl 5-(1,1,2-trifluoro-2-(perfluoropropoxy)ethoxy)isophthalate.

6. The composition of claim 5 wherein the dimethyl 5-(1,1,2-trifluoro-2-(perfluoropropoxy)ethoxy) isophthalate is present at a molar concentration in the range of 40 to 60 mol-%.

7. The composition of claim 1 wherein the first aromatic polyester is poly(trimethylene terephthalate), the second aromatic polyester is present at a concentration in the range of 1-3% by weight, wherein the second aromatic polyester the fluorovinylether functionalized repeat unit represented by the structure I is dimethyl 5-(1,1,2-trifluoro-2-(1,1,2,3,3,3-hexafluoro-2-(perfluoropropoxy)propoxy)ethoxy)isophthalate present at a molar concentration of 40-60 mol-%.

8. A process of producing a blend composition comprising combining a first aromatic polyester selected from the group consisting of poly(trimethylene terephthalate) (PTT), poly(ethylene naphthalate) (PEN), poly(ethylene isophthalate), poly(trimethylene isophthalate), poly(butylene isophthalate), mixtures thereof, and copolymers thereof, with a second aromatic polyester to form a combination wherein the second aromatic polyester is present in the combination at a concentration in the range of 0.1 to 10% by weight of the total composition; heating the combination to a temperature between the softening point of the first aromatic polyester and the degradation temperature of at least one component of the combination to form a viscous liquid mixture, and mixing the viscous liquid mixture; the second aromatic polyester comprising a molar concentration in the range of 40 to 100 mol-% of fluorovinylether functionalized repeat units represented by structure I wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by structure II with the proviso that only one R can be OH or the radical represented by the structure II;
$R^1$ is a $C_2$-$C_4$ alkylene radical which can be branched or unbranched;
X is O or $CF_2$;
Z is H or Cl;
a=0 or 1;
and,
Q represents the structure Ia $$\begin{array}{c} \mathrm{F} \\ -\mathrm{C}-\mathrm{Rf}^1- \\ | \\ [\mathrm{Y}-\mathrm{Rf}^2\,]_q-\mathrm{F} \end{array} \quad \text{Ia}$$

wherein q=0-10;
Y is O or $CF_2$;
$Rf^1$ is $(CF_2)_n$, wherein n is 0-10;
and,
$Rf^2$ is $(CF_2)_p$, wherein p is 0-10, with the proviso that when p is 0, Y is $CF_2$.

9. The process of claim 8 wherein the first aromatic polyester is poly(trimethylene terephthalate).

10. The process of claim 8 wherein the second aromatic polyester the fluorovinylether functionalized repeat unit represented by the structure I is dimethyl 5-(1,1,2-trifluoro-2-(1,1,2,3,3,3-hexafluoro-2-(perfluoropropoxy)propoxy)ethoxy) isophthalate.

11. The process of claim 10 wherein the dimethyl 5-(1,1,2-trifluoro-2-(1,1,2,3,3,3-hexafluoro-2-(perfluoropropoxy)propoxy)ethoxy)isophthalate is present at a molar concentration in the range of 40 to 60 mol-%.

12. The process of claim 8 wherein the second aromatic polyester the fluorovinylether functionalized repeat unit represented by the structure I is dimethyl 5-(1,1,2-trifluoro-2-(perfluoropropoxy)ethoxy)isophthalate.

13. The process of claim 12 wherein the dimethyl 5-(1,1,2-trifluoro-2-(perfluoropropoxy)ethoxy)isophthalate is present at a molar concentration in the range of 40 to 60 mol-%.

14. The process of claim 8 wherein the first aromatic polyester is poly(trimethylene terephthalate), the second aromatic polyester is present at a concentration in the range of 1-3% by weight, wherein the second aromatic polyester the fluorovinylether functionalized repeat unit represented by the structure t is dimethyl 5-(1,1,2-trifluoro-2-(1,1,2,3,3,3-hexafluoro-2-(perfluoropropoxy)propoxy)ethoxy) isophthalate present at a molar concentration of 40-60 mol-%.

* * * * *